United States Patent
Matsumoto et al.

(10) Patent No.: US 9,465,517 B2
(45) Date of Patent: Oct. 11, 2016

(54) CHARACTER INPUT DEVICE AND CAR NAVIGATION DEVICE EQUIPPED WITH CHARACTER INPUT DEVICE

(75) Inventors: Atsushi Matsumoto, Tokyo (JP); Wataru Yamazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 479 days.

(21) Appl. No.: 13/982,571

(22) PCT Filed: May 24, 2011

(86) PCT No.: PCT/JP2011/002889
§ 371 (c)(1),
(2), (4) Date: Jul. 30, 2013

(87) PCT Pub. No.: WO2012/160601
PCT Pub. Date: Nov. 29, 2012

(65) Prior Publication Data
US 2013/0311933 A1 Nov. 21, 2013

(51) Int. Cl.
*G06F 3/048* (2013.01)
*G06F 3/0482* (2013.01)
*G01C 21/36* (2006.01)
(Continued)

(52) U.S. Cl.
CPC ............. *G06F 3/0482* (2013.01); *G01C 21/36* (2013.01); *G06F 3/018* (2013.01); *G06F 3/0237* (2013.01); *G06F 3/04886* (2013.01); *G06F 17/276* (2013.01)

(58) Field of Classification Search
CPC ............................ G01C 21/36; G06F 3/0237
See application file for complete search history.

(56) References Cited

U.S. PATENT DOCUMENTS 4,777,600 A    10/1988   Saito et al.
5,845,300 A *   12/1998   Comer ................. G06F 17/276
                                                                           715/203
(Continued)

FOREIGN PATENT DOCUMENTS

DE    102005057312 A1   6/2007
DE    112006003659 T5   11/2008
(Continued)

OTHER PUBLICATIONS

Ichimura et al., "Kana-Kanji Conversion System with Input Support Based on Prediction," Proceedings of the 18th conference on Computational linguistics, vol. 1, 2000, pp. 341-347.
(Continued)

*Primary Examiner* — William Bashore
*Assistant Examiner* — Nathan Shrewsbury
(74) *Attorney, Agent, or Firm* — Birch, Stewart, Kolasch & Birch, LLP

(57) ABSTRACT

A character input device provides a function of deleting an unconfirmed inputted character which the user is currently inputting, and a function of changing a confirmed character string to an unconfirmed state to a single correction key. Therefore, the character input device enables the user to carry out a character input efficiently by using limited space without requiring an excessive operation and arrangement of a new key for reconversion. Further, because the character input device holds the information on confirmed character strings even after all the character strings have been confirmed, the character input device enables the user to arbitrarily select a character string which the user wants to correct at any time, and re-edit only the portion.

14 Claims, 29 Drawing Sheets

(51) Int. Cl.
*G06F 17/27* (2006.01)
*G06F 3/01* (2006.01)
*G06F 3/023* (2006.01)
*G06F 3/0488* (2013.01)

(56) References Cited

U.S. PATENT DOCUMENTS

| | | | | |
|---|---|---|---|---|
| RE39,326 E | * | 10/2006 | Comer | G06F 17/276 |
| | | | | 715/203 |
| 2003/0023426 A1 | | 1/2003 | Pun et al. | |
| 2005/0131686 A1 | * | 6/2005 | Yamamoto | G10L 15/197 |
| | | | | 704/231 |
| 2006/0080034 A1 | * | 4/2006 | Hayashi | G01C 21/3629 |
| | | | | 701/431 |
| 2008/0133230 A1 | * | 6/2008 | Herforth | G01C 21/26 |
| | | | | 704/235 |
| 2008/0208452 A1 | * | 8/2008 | Stocker | G01C 21/3407 |
| | | | | 701/533 |
| 2009/0102805 A1 | * | 4/2009 | Meijer | G06F 3/016 |
| | | | | 345/173 |
| 2011/0201387 A1 | * | 8/2011 | Paek | G06F 3/0237 |
| | | | | 455/566 |
| 2011/0242032 A1 | * | 10/2011 | Seo | G06F 3/04886 |
| | | | | 345/173 |
| 2012/0221860 A1 | * | 8/2012 | Hoornaert | G06F 21/34 |
| | | | | 713/172 |
| 2014/0136109 A1 | * | 5/2014 | Sumiyoshi | G01C 21/3664 |
| | | | | 701/539 |
| 2015/0029105 A1 | | 1/2015 | Fux et al. | |

FOREIGN PATENT DOCUMENTS

| | | |
|---|---|---|
| JP | 11-184850 A | 7/1999 |
| JP | 2000-322181 A | 11/2000 |
| JP | 2003-216603 A | 7/2003 |
| JP | 2005-258577 A | 9/2005 |
| JP | 2008-83848 A | 4/2008 |
| JP | 2008-293306 A | 12/2008 |
| JP | 2009-132266 A | 6/2009 |
| JP | 2009-151721 A | 7/2009 |
| JP | 2009-217665 A | 9/2009 |
| JP | 2010-117776 A | 5/2010 |

OTHER PUBLICATIONS

Android, "Book for making 100 times good use of Android smart phone on business", by LINKUP, first edition, GALAXY S ISO3 REGZA Phone (T-01C) LYNX 3D-capable, Japan, SOTECHSHA Co. Ltd., Apr. 30, 2011, ISBN: 978-4-88166-783-5, p. 37.

Kinoshita, "ATOK 2007 for Mac Premium; Efficient entry can be available by mounting the latest conversion engine", Mac People, ASCII Corporation, vol. 13, No. 9, Sep. 1, 2007, pp. 220-221.

Garay-Vitoria et al., "Text prediction systems: a survey," Universal Access in the Information Society, vol. 4, 2006 (Published online Dec. 8, 2005), pp. 188-203.

Nadenau et al., "Human Vision Models for Perceptually Optimized Image Processing—A Review," Proceedings of the IEEE, 2000, pp. 1-15.

* cited by examiner

| とうき (touki_) | | | | Correct |
|---|---|---|---|---|
| あ(a) | か(ka) | さ(sa) | とうきゃくでぱーと (toukyakudepa-to) | |
| た(ta) | な(na) | は(ha) | とうきょう (toukyou) | |
| ま(ma) | や(ya) | ら(ra) | とうきょうと (toukyouto) | |
| ゛゜ | わ(wa) | → | とうきょうえき (toukyoueki) | |

(b)

| とうきょうと__(toukyouto_) | | | | Correct |
|---|---|---|---|---|
| あ(a) | か(ka) | さ(sa) | ちよだく (chiyodaku) | |
| た(ta) | な(na) | は(ha) | ちゅうおうく (chuuouku) | |
| ま(ma) | や(ya) | ら(ra) | みなとく (minatoku) | |
| ゛゜ | わ(wa) | → | しんじゅくく (shinjukuku) | |

FIG.6

| Representation | Phonetic Information | Characters Inputted Immediately Before Character String Is Confirmed | Start Position Of Representation | String Length Of Representation | Phrase Position |
|---|---|---|---|---|---|
| とうきょうと (toukyouto) | とうきょうと (toukyouto) | とうき (touki) | 1 | 6 | 1 |

| とうき (touki_) | | | | Correct |
|---|---|---|---|---|
| あ(a) | か(ka) | さ(sa) | 東客デパート (toukyakudepa-to) | |
| た(ta) | な(na) | は(ha) | 東京 (toukyou) | |
| ま(ma) | や(ya) | ら(ra) | 東京都 (toukyouto) | |
| ﾞﾟ | わ(wa) | → | 東京駅 (toukyoueki) | |

(b)

| 東京都__(toukyouto_) | | | | Correct |
|---|---|---|---|---|
| あ(a) | か(ka) | さ(sa) | 千代田区 (chiyodaku) | |
| た(ta) | な(na) | は(ha) | 中央区 (chuuouku) | |
| ま(ma) | や(ya) | ら(ra) | 港区 (minatoku) | |
| ﾞﾟ | わ(wa) | → | 新宿区 (shinjukuku) | |

FIG.9

| Representation | Phonetic Information | Characters Inputted Immediately Before Character String Is Confirmed | Start Position Of Representation | String Length Of Representation | Phrase Position |
|---|---|---|---|---|---|
| 東京都 (toukyouto) | とうきょうと (toukyouto) | とうき (touki) | 1 | 3 | 1 |

| 東京都__(toukyouto_) | | | Correct |
|---|---|---|---|
| あ(a) | か(ka) | さ(sa) | 千代田区 (chiyodaku) |
| た(ta) | な(na) | は(ha) | 中央区 (chuuouku) |
| ま(ma) | や(ya) | ら(ra) | 港区 (minatoku) |
| ﾟﾞ | わ(wa) | → | 新宿区 (shinjukuku) |

(b)

| とうきょうと__ (toukyouto_) | | | Correct |
|---|---|---|---|
| あ(a) | か(ka) | さ(sa) | 東京都 (toukyouto) |
| た(ta) | な(na) | は(ha) | 東京都立 (toukyoutoritsu) |
| ま(ma) | や(ya) | ら(ra) | |
| ﾟﾞ | わ(wa) | → | |

(c)

| 東京都立__ (toukyoutoritsu_) | | | Correct |
|---|---|---|---|
| あ(a) | か(ka) | さ(sa) | 図書館 (toshokan) |
| た(ta) | な(na) | は(ha) | 美術館 (bijutsukan) |
| ま(ma) | や(ya) | ら(ra) | 病院 (byouin) |
| ﾟﾞ | わ(wa) | → | |

| SAN__ | | | Correct |
|---|---|---|---|
| ABC | DEF | GHI | SAN JOSE |
| JKL | MNO | PQR | SAN FRANCISCO |
| STU | VWX | YZ | SAN FRANCISCO HOTEL |
| *° | | → | |

(b)

| SAN FRANCISCO__ | | | Correct |
|---|---|---|---|
| ABC | DEF | GHI | AIRPORT |
| JKL | MNO | PQR | LIBRARY |
| STU | VWX | YZ | |
| *° | | → | |

FIG.13

| Representation | Phonetic Information | Characters Inputted Immediately Before Character String Is Confirmed | Start Position Of Representation | String Length Of Representation | Phrase Position |
|---|---|---|---|---|---|
| SAN FRANCISCO | SAN FRANCISCO | SAN | 1 | 13 | 1 |

| SAN FRANCISCO__ | | | Correct |
|---|---|---|---|
| ABC | DEF | GHI | AIRPORT |
| JKL | MNO | PQR | LIBRARY |
| STU | VWX | YZ | |
| *° | | → | |

(b)

| SAN FRANCISCO__ | | | Correct |
|---|---|---|---|
| ABC | DEF | GHI | SAN FRANCISCO |
| JKL | MNO | PQR | SAN FRANCISCO HOTEL |
| STU | VWX | YZ | |
| *° | | → | |

(c)

| SAN FRANCISCO HOTEL __ | | | Correct |
|---|---|---|---|
| ABC | DEF | GHI | OOO |
| JKL | MNO | PQR | ××× |
| STU | VWX | YZ | |
| *° | | → | |

FIG.19
(a)
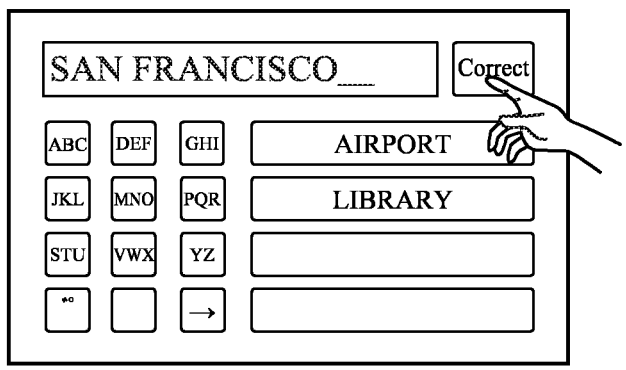
(b)
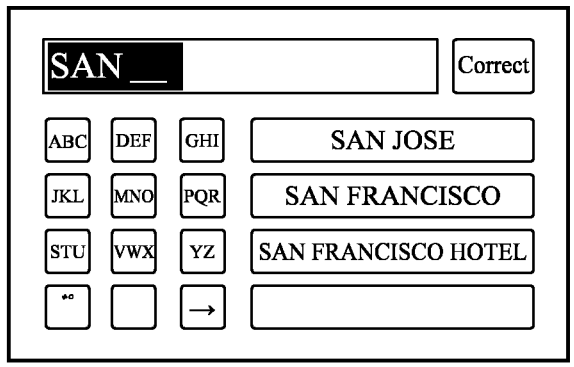
(c)
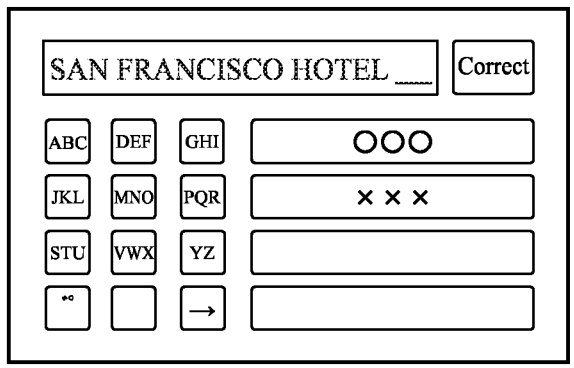

FIG.23
(a)
(b)
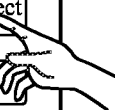
(c)

FIG.24

| Representation | Phonetic Information | Characters Inputted Immediately Before Character String Is Confirmed | Start Position Of Representation | String Length Of Representation | Phrase Position |
|---|---|---|---|---|---|
| 東京都 (toukyouto) | とうきょうと (toukyouto) | とうき (touki) | 1 | 3 | 1 |
| 千代田区 (chiyodaku) | ちよだく (chiyodaku) | ちよ (chiyo) | 4 | 4 | 2 |
| 霞が関 (kasumigaseki) | かすみがせき (kasumigaseki) | かすみ (kasumi) | 8 | 3 | 3 |
| 一丁目 (icchoume) | いっちょうめ (icchoume) | いっちょ (iccho) | 11 | 3 | 4 |

FIG.26

CHARACTER INPUT DEVICE AND CAR NAVIGATION DEVICE EQUIPPED WITH CHARACTER INPUT DEVICE

FIELD OF THE INVENTION

The present invention relates to a character input device and a car navigation device equipped with the character input device.

BACKGROUND OF THE INVENTION

Information equipment, such as a car navigation device or a mobile phone, equipped with a character input device having an input prediction function is known. In a conventional character input device, when erroneously selecting a predicted candidate and then confirming the selection, the user needs to temporarily delete all of the selected character string which he or she has confirmed and input the same characters again. Thus, the efficiency of the character input is bad. Particularly, in a character input device, such as a car navigation device or a mobile phone, in which input keys are arranged in limited space, because a plurality of characters are assigned to each input key in many cases, and it takes much time for the user to input characters, an operation of re-inputting the same characters again requires a great deal of time.

To solve this problem, for example, patent reference 1 describes a character input device that enables the user to delete input character data displayed on the character input device and, even after making the character input device carry out kana-Chinese character conversion on an inputted character string and then confirming the conversion, enables the user to specify a phrase and then push down a clear key for commanding a return to the immediately-preceding operation or the like while kana characters in the next phrase are converted to Chinese characters to make the character input device return the confirmed character string to a kana character string yet-to-be-confirmed and carry out kana-Chinese character conversion on this character string again. Further, for example, patent reference 2 describes a character input device that in a mode of converting an inputted character string on a per phrase basis, enables the user to specify a phrase to be corrected to make the character input device carry out kana-Chinese character conversion on this phrase again even after carrying out kana-Chinese character conversion on the inputted character string when the user has not pushed down an enter key, but has pushed down a temporary enter key. In addition, for example, patent reference 3 describes a character input device that when the user erroneously selects a predicted candidate based on input characters and then confirms the selection, and, immediately after that, pushes down a delete key, deletes the predicted candidate which the user has selected erroneously and confirmed, and displays the characters inputted thereto before the confirmation.

RELATED ART DOCUMENT

Patent Reference

Patent reference 1: Japanese Unexamined Patent Application Publication No. 2003-216603
Patent reference 2: Japanese Unexamined Patent Application Publication No. 2010-117776
Patent reference 3: Japanese Unexamined Patent Application Publication No. 2008-83848

SUMMARY OF THE INVENTION

Problems to be Solved by the Invention

A problem with the conventional character input devices as above is, however, that the conventional character input devices can only carry out reconversion on a phrase which has been confirmed immediately before or can only carry out reconversion on a phrase which has been confirmed temporarily, but cannot carryout reconversion on an inputted character string after every of all the phrases of the inputted character string has been confirmed. A further problem is that when temporarily confirming a phrase, the user needs to perform an excessive operation of changing the phrase to a temporary confirmed state, and the character input device requires excessive space for providing a temporary enter key.

The present invention is made in order to solve the above-mentioned problems, and it is therefore an object of the present invention to provide a character input device that requires neither an excessive operation nor arrangement of a new key for reconversion, but can efficiently carry out an character input with limited space, and a car navigation device equipped with the character input device.

Means for Solving the Problem

In order to achieve the above-mentioned object, in accordance with the present invention, there is provided a character input device that carries out an input and an edit of characters, the character input device including: a key input unit for accepting a command to input and edit the above-mentioned characters; a character string edit control unit for controlling an edit and confirmation of a character string in response to the command from the above-mentioned key input unit; a character string prediction engine unit for receiving a character string as an input and predicting a character string including the above-mentioned character string and subsequent characters; a character string input processing unit for acquiring candidates for the character string predicted by the above-mentioned character string prediction engine unit; a confirmed character string information storing unit for storing information on a character string selected from the above-mentioned candidates acquired as information on a confirmed character string in a confirmed state; a character string confirmed state determining unit for determining whether or the character string edited by the above-mentioned character string edit control unit is in the above-mentioned confirmed state; and an input character string display unit for displaying the character string edited by the above-mentioned character string edit control unit, in which the above-mentioned key input unit has a single correction key, and, when the above-mentioned correction key is operated while the above-mentioned character string is not in the confirmed state, outputs a command to delete the above-mentioned inputted character string to the above-mentioned character string edit control unit, and, when the above-mentioned correction key is operated while the above-mentioned character string is in the confirmed state, outputs a command to change the above-mentioned confirmed character string to an unconfirmed state to the above-mentioned character string edit control unit.

Advantages of the Invention

Because the character input device in accordance with the present invention provides the function of deleting an unconfirmed inputted character which the user is currently inputting, and the function of changing a confirmed character string to the unconfirmed state to the single correction key, the character input device enables the user to carry out a character input efficiently by using limited space without requiring an excessive operation and arrangement of a new key for reconversion. Further, because the character input device holds the information on confirmed character strings even after all the character strings have been confirmed, the character input device enables the user to arbitrarily select a character string which the user wants to correct at any time, and re-edit only the portion.

BRIEF DESCRIPTION OF THE FIGURES

FIG. 5 is a diagram showing an example of an operation at a time when a user inputs characters and an example of a transition of a display screen in the character input device in accordance with Embodiment 1;

FIG. 6 is a table showing an example of information stored in a confirmed character string information storing unit 5 in accordance with Embodiment 1;

FIG. 8 is a diagram showing an example of an operation at a time when a user inputs characters and an example of a transition of a display screen in a character input device in accordance with Embodiment 2;

FIG. 9 is a table showing an example of information stored in a confirmed character string information storing unit 5 in accordance with Embodiment 2;

FIG. 10 is a diagram showing an example of an operation at a time when a user corrects characters and an example of a transition of the display screen in the character input device in accordance with Embodiment 2;

FIG. 12 is a diagram showing an example of an operation at a time when a user inputs characters and an example of a transition of a display screen in a character input device in accordance with Embodiment 3;

FIG. 13 is a table showing an example of information stored in a confirmed character string information storing unit 5 in accordance with Embodiment 3;

FIG. 14 is a diagram showing an example of an operation at a time when a user corrects characters and an example of a transition of the display screen in the character input device in accordance with Embodiment 3;

FIG. 19 is a diagram showing an example of an operation at a time when a user corrects characters and another example (when the character string is an English one) of a transition of the display screen when the initial setting in the initial setting unit 14 is "characters inputted immediately before confirmed" in the character input device in accordance with Embodiment 4;

FIG. 23 is a diagram showing an operation transition at a time when a user selects a character string which he or she wants to correct in the character input device in accordance with Embodiment 6;

FIG. 24 is a table showing an example of information stored in a confirmed character string information storing unit 5 in accordance with Embodiment 6;

FIG. 26 is a diagram showing an operation transition at a time when a user selects a character string which he or she wants to correct in the character input device in accordance with Embodiment 7;

EMBODIMENTS OF THE INVENTION

Hereafter, the preferred embodiments of the present invention will be explained in detail with reference to the drawings.

Embodiment 1

Figure 1:
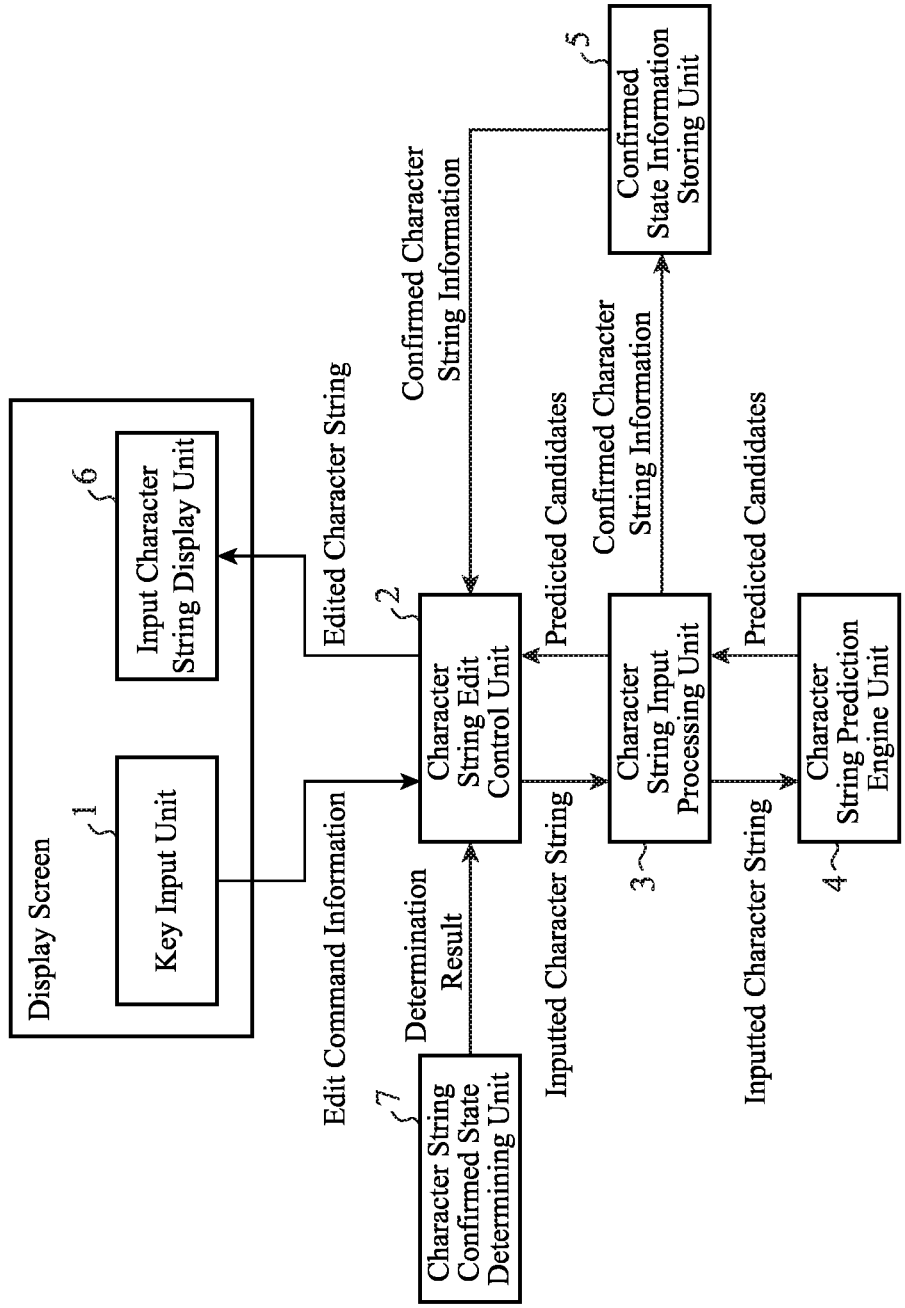
FIG. 1 is a block diagram showing the structure of a character input device in accordance with Embodiment 1.

FIG. 1 is a block diagram showing the structure of a character input device in Embodiment 1 of the present invention. This character input device includes a key input unit 1, a character string edit control unit 2, a character string input processing unit 3, a character string prediction engine unit 4, a confirmed character string information storing unit 5, an input character string display unit 6, and a character string confirmed state determining unit 7. It is assumed hereafter that this character input device is mounted in a car navigation device. The character input device will be explained by taking, as an example, a case in which a place name, an address, a facility name, or the like is inputted to the character input device.

The key input unit 1 has a plurality of keys for accepting an input of characters and a command to edit a character string. The character string prediction engine unit 4 predicts a character string which a user probably wants to input finally (a character string including an inputted character string and subsequent characters) from a character string which the user is inputting by using the key input unit 1. The character string input processing unit 3 acquires candidates for the character string predicted by the character string prediction engine unit 4. The character string edit control unit 2 controls an edit and confirmation of a character string in response to a command from the key input unit 1. More specifically, the character string edit control unit controls an edit including an input, a deletion, an insertion, or the like of a character string, and controls an edit and confirmation of a candidate for the character string which is acquired by the character string input processing unit 3. The input character string display unit 6 displays a character string edited by the character string edit control unit 2, i.e., a character string on which an input, a deletion, an insertion, or the like is carried out by the key input unit 1, a candidate for the character string which is acquired by the character string input processing unit 3, or the like. When a character string is selected and confirmed from the candidates acquired by the character string input processing unit 3, which are displayed on the input character string display unit 6, the character input device stores information on the confirmed character string in the confirmed character string information storing unit as information on a confirmed character string. In this confirmed character string information storing unit 5, the representation of the confirmed character string, the phonetic information of the confirmed character string, the characters inputted immediately before the character string is confirmed, the start position of the representation of the confirmed character string, the string length of the representation of the confirmed character string, information on the position of the phrase in which the representation of the confirmed character string appears, and so on are stored. Further, plural pieces of confirmed character string information can be stored in the confirmed character string information storing unit 5. After that, the confirmed character string information is held even after all character strings are confirmed. The character string confirmed state determining unit 7 determines whether or not a character string edited by the character string edit control unit 2 is in a confirmed state (whether or not the character string is a confirmed character string).

Figure 2:
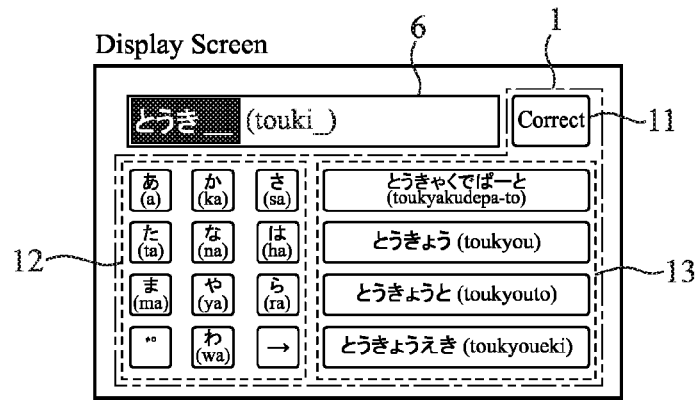
FIG. 2 is a diagram showing an example of a key input unit 1 and an input character string display unit 6 which are displayed on a display screen in a character input device in accordance with the present invention.

FIG. 2 is a diagram showing an example of the key input unit 1 and the input character string display unit 6 displayed on a display screen. The key input unit 1 includes a single correction key 11, a plurality of character input keys 12, and keys 13 for displaying a plurality of character string candidates. In this example, the correction key 11 included in the key input unit 1 has a function of commanding a deletion of a character and a function of changing a confirmed character string to an unconfirmed state. The character input device switches between these two functions of the correction key according to the state of a character string which is determined by the character string confirmed state determining unit 7. More specifically, when a character string is not in the confirmed state (when the user is performing an input operation and the inputted character string is still in the unconfirmed state), the user is enabled to push down the correction key 11 to cause the character input device to output a command to delete a single character from the inputted character string to the character string edit control unit 2, and delete the single character displayed on the input character string display unit 6 and currently being inputted one by one. In contrast, when a character string is in the confirmed state (when the character string is a confirmed one), the user is enabled to push down the correction key 11 to cause the character input device to output a command to change the confirmed character string to the unconfirmed state to the character string edit control unit 2, so that the confirmed character string already selected and confirmed, and displayed on the input character string display unit 6 is changed to the unconfirmed state. The meaning of the present invention of "changing a confirmed character string to the unconfirmed state" will be mentioned below in detail with reference to drawings. Further, in the keys 13 for displaying character string candidates in the key input unit 1, the candidates for character string which are predicted by the character string prediction engine unit 4 are displayed, and the user is enabled to select his or her desired character string from the character string candidates.

Figure 3:
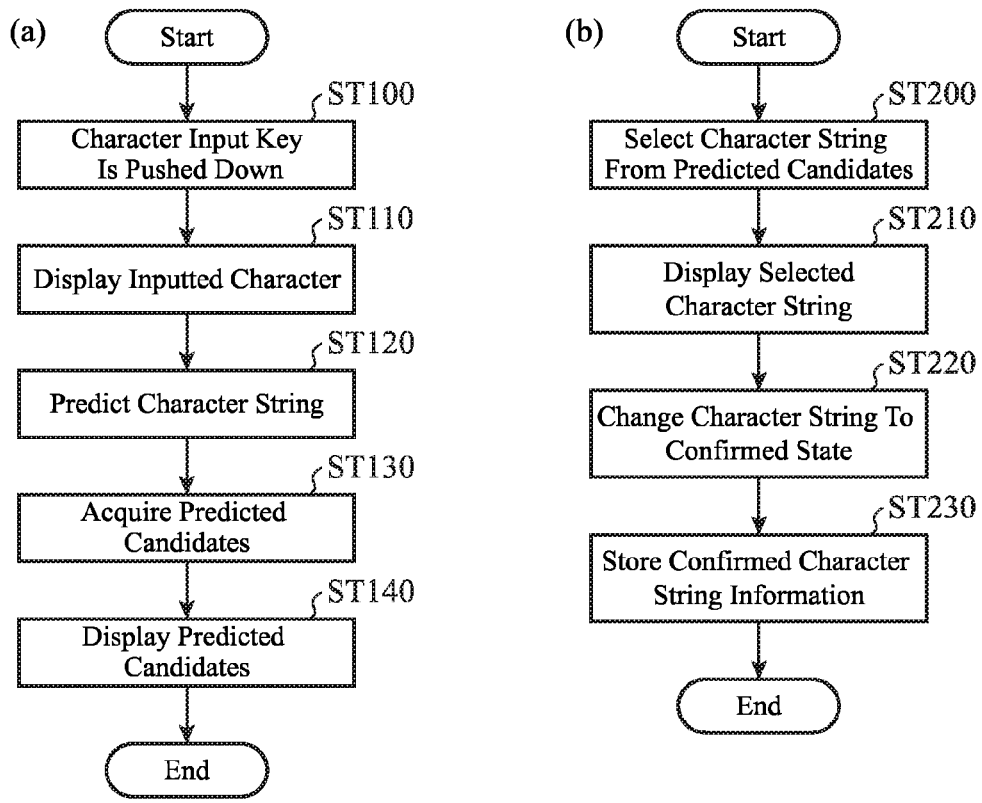
FIG. 3 is a flow chart explaining a process at a time when a character string is inputted and a process at a time when one of candidates predicted is selected in the character input device in accordance with Embodiment 1.
Figure 4:
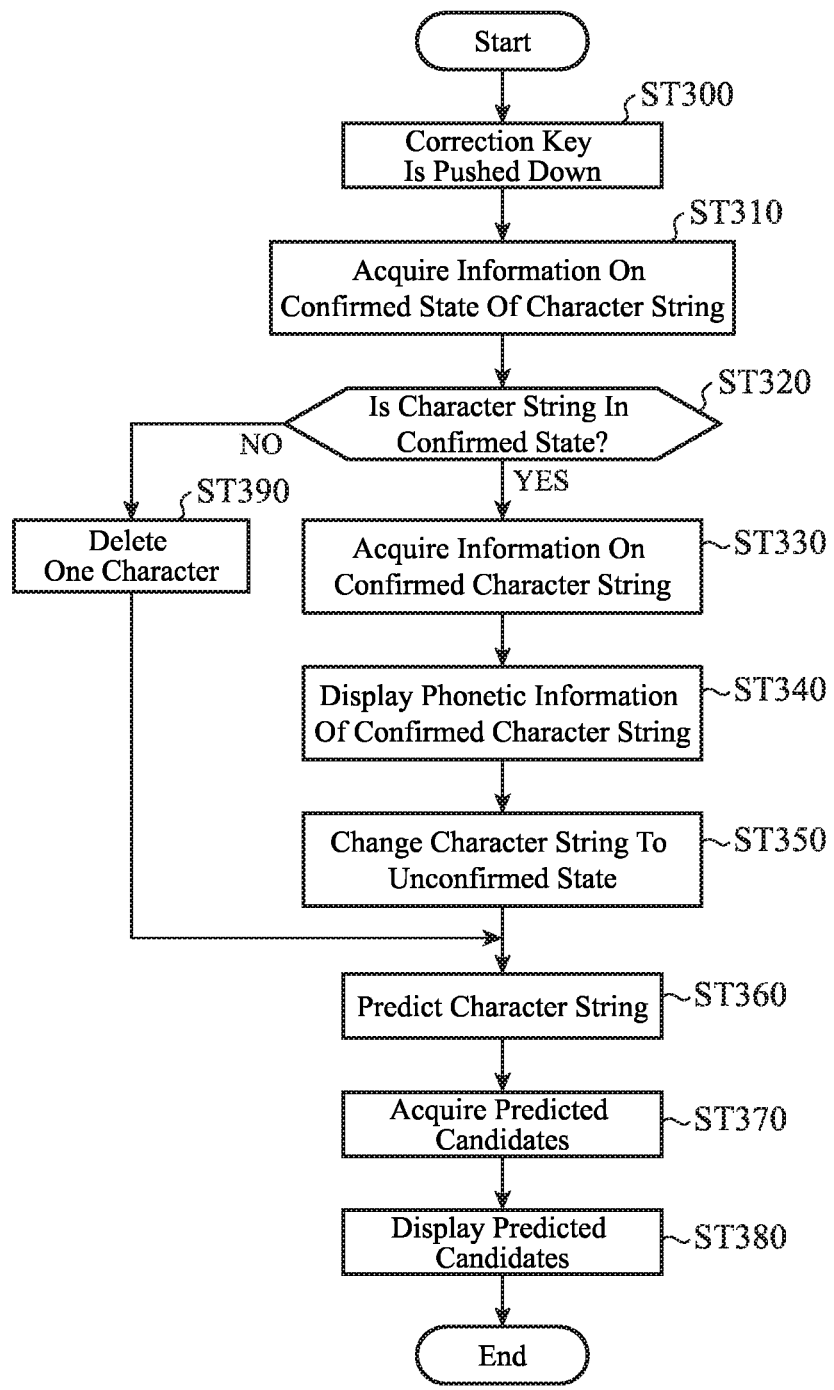
FIG. 4 is a flow chart showing a process at a time when a user corrects an inputted character string in the character input device in accordance with Embodiment 1.

Next, the operation of the character input device will be explained. FIGS. 3 and 4 are flow charts explaining processes carried out by the character input device in accordance with Embodiment 1 of the present invention. First, a process at a time when a character string is inputted will be explained with reference to FIG. 3(a). When one of the character input keys 12 included in the key input unit 1 is pushed down (step ST100), the key input unit 1 provides a command to input a character to the character string edit control unit 2. The character string edit control unit 2 displays the character pushed down on the input character string display unit 6 (step ST110), and sends this displayed character string to the character string input processing unit 3. The character input processing unit 3 sends the character string sent thereto to the character string prediction engine unit 4, and the character string prediction engine unit 4 predicts a character string which the user probably wants to input finally (a character string including the inputted character string and subsequent characters) to generate candidates for the character string (step ST120). The character string input processing unit 3 acquires the candidates for the character string which are generated by the character string prediction engine unit 4 (step ST130). The character string edit control unit 2 displays the candidates for the character string which are acquired by the character string input processing unit 3 in the keys 13 included in the key input unit 1 for displaying character string candidates (step ST140).

Further, a process at a time when one of the candidates predicted is selected will be explained with reference to FIG. 3(b). When one of the candidates displayed on the key 13 for displaying character string candidates of the key input unit 1 is selected by the user (step ST200), the character string edit control unit 2 displays the selected character string on the input character string display unit (step ST210), and places the character string in the confirmed state (step ST220). The character string input processing unit 3 then stores the representation of the confirmed character string, the phonetic information of the confirmed character string, the characters inputted immediately before the character string is confirmed, the start position of the representation of the confirmed character string, the string length of the representation of the confirmed character string, and the position information of the phrase in which the representation of the confirmed character string appears in the confirmed character string information storing unit storing 5 as information on the confirmed character string (step ST230).

Further, a process at a time when an inputted character string is corrected will be explained with reference to FIG. 4. When the correction key 11 is pushed down (step ST300), the character string edit control unit 2 acquires the information on whether or not the character string is in the confirmed state (whether or not the character string is a confirmed one) from the character string confirmed state determining unit 7 (step ST310). When the character string is in the confirmed state (when YES in step ST320), the character string edit control unit 2 acquires the information on the confirmed state from the confirmed character string information storing unit 5 (step ST330). The character string edit control unit 2 then displays the phonetic information of the confirmed character string (the reading of the confirmed character string) from the information on the confirmed character string which the character string edit control unit has acquired on the input character string display unit 6 (step ST340), and changes the confirmed character string to the unconfirmed state (step ST350). After that, the character string edit control unit sends the phonetic information to the character string prediction engine unit 4, and the character string prediction engine unit 4 newly generates predicted candidates for the character string (step ST360). The character string input processing unit 3 acquires the candidates for the character string which are generated by the character string prediction engine unit 4 (step ST370). The character string edit control unit 2 displays the candidates for the character string which are acquired by the character string input processing unit 3 in the keys 13 included in the key input unit 1 for displaying character string candidates (step ST380). In contrast, when the correction key 11 is pushed down and the character string is in the unconfirmed state (when NO in step ST320), the character string edit control unit 2 deletes a single character from the character string in the unconfirmed state displayed on the input character string display unit 6 (step ST390), and carries out the same character string prediction process (steps ST360 to S380) by using the character string (still in the unconfirmed state) from which the single character has been deleted.

FIG. 5 is a diagram showing an example of an operation at a time when the user inputs characters and an example of a transition of the display screen in the character input device in accordance with Embodiment 1. When the user pushes down character input keys 12 of the key input unit 1 to input a character string "とうき (touki)" (FIG. 5(*a*)), the character string prediction engine unit 4 predicts a character string including the character string "とうき (touki)" and subsequent characters. The character string prediction engine unit displays predicted candidates (e.g., "とうきゃくでぱーと (toukyakudepa-to)", "とうきょう (toukyou)", "とうきょうと (toukyouto)", and "とうきょうえき (toukyoueki)") in the keys 13 for displaying character string candidates, and enables the user to select his or her desired character string from the displayed candidates (FIG. 5(*a*)). At this time, the inputted character string "とうき (touki)" is in the unconfirmed state. In order to notify the user that the character string is in the unconfirmed state, the character input device can display the character string in such a way that its characters are "white on a black background," for example (FIG. 5(*a*)). In this case, when the user selects "とうきょうと (toukyouto)" from the candidates displayed, for example, "とうきょうと (toukyouto)" is displayed on the input character string display unit 6, and the displayed character string is placed in the confirmed state (FIG. 5(*b*)). Also in this case, in order to notify the user that the character string is in the confirmed state, the character input device can display the character string in such a way that its characters are "black on a white background," for example (FIG. 5(*b*)).

At this time, information on the confirmed character string is stored in the confirmed character string information storing unit 5, as shown in, for example, FIG. 6. In this example, information including the representation "とうきょうと (toukyouto)" of the confirmed character string, the phonetic information "とうきょうと (toukyouto)", the characters "とうき (touki)" inputted immediately before the character string is confirmed, the start position "1" of the representation, the string length "6" of the representation, and the phrase position "1" is stored as the information on the confirmed character string "とうきょうと (toukyouto)" through the operations shown in FIGS. 5(*a*) and 5(*b*).

Figure 7:
FIG. 7 is a diagram showing an example of an operation at a time when a user corrects characters and an example of a transition of the display screen in the character input device in accordance with Embodiment 1.

FIG. 7 is a diagram showing an example of an operation at a time when the user corrects characters and an example of a transition of the display screen in the character input device in accordance with Embodiment 1. FIG. 7(*a*) shows a state in which the character string "とうきょうと (toukyouto)" is placed in the confirmed state through the operations shown in FIGS. 5(*a*) and 5(*b*). At this time, the character input device predicts a character string further following the confirmed character string "とうきょうと (toukyouto)" and acquires candidates for the character string (e.g., "ちよだく (chiyodaku)", "ちゅうおうく (chuuouku)", "みなとく (minatoku)", and "しんじゅくく (shinjukuku)") by using the character string input processing unit 3, and displays the candidates in the keys 13 for displaying character string candidates (FIG. 7(*a*)). When the user wants to correct the confirmed character string "とうきょうと (toukyouto)" to "とうきょうとりつ (toukyoutoritsu)" and then pushes down the correction key 11, the character input device displays the previously-confirmed character string "とうきょうと (toukyouto)" on the input character string display unit 6 in a state in which the character string is changed to the unconfirmed state (FIG. 7(*b*)). At this time, the character input device predicts a character string including the unconfirmed character string "とうきょうと (toukyouto)" and subsequent characters by using the character string prediction engine unit 4, and acquires candidates for the character string (e.g., "とうきょうと (toukyouto)" and "とうきょうとりつ (toukyoutoritsu)") by using the character string input processing unit 3 to display the candidates in the keys 13 for displaying character string candidates (FIG. 7(*b*)). When the user then selects "とうきょうとりつ (toukyoutoritsu)" which is the character string which the user wants to input from the beginning, the character input device displays "とうきょうとりつ (toukyoutoritsu)" on the input character string display unit 6 and places this character string in the confirmed state (FIG. 7(*c*)). The character string prediction engine unit 4 predicts a character string further following the confirmed character string "とうきょうとりつ (toukyoutoritsu)," and the character string input processing unit 3 acquires candidates for the character string (e.g., "としょかん (toshokan)", "びじゅつかん (bijutsukan)", and "びょういん (byouin)") to display the candidates in the keys 13 for displaying character string candidates (FIG. 7(c)).

Hereafter, the meaning of "changing the confirmed character string to the unconfirmed state" at a time of making a transition from FIG. 7(a) to FIG. 7(b) will be explained in detail. For example, it is assumed, as shown in FIG. 5(a), the user inputs "とうき (touki)" and then selects "とうきょうと (toukyouto)" from the displayed candidates, and "とうきょうと (toukyouto)" is displayed as the confirmed character string (FIG. 5(b)). At this time, when the user pushes down the correction key 11 to cause the character input device to carry out a process of returning the confirmed character string to the characters inputted immediately before the character string is confirmed, i.e., when the user pushes down the correction key 11 in the state shown in FIG. 5(b) to cause the character input device to return the confirmed character string to "とうき (touki)" in the unconfirmed state (state shown in FIG. 5(a)) to display "とうき (touki)," this process is expressed as "changing the confirmed character string to the character string before the character string is confirmed." In contrast, changing the confirmed character string "とうきょうと (toukyouto)" to the unconfirmed state and displaying this character string (state shown in FIG. 7(b)) in response to the user's pushdown of the correction key 11 in the state shown in FIG. 5(b), as shown in the present invention, is expressed as "changing the confirmed character string to the unconfirmed state."

As mentioned above, in accordance with this Embodiment 1, when the user has selected "とうきょうと (toukyouto)" erroneously to confirm this character string in a state in which the user has inputted only "とうき (touki)", as shown in, for example, FIG. 5 or 7, and then pushes down the correction key 11, the character input device does not return to the characters inputted immediately before the character is confirmed ("とうき (touki)" in the unconfirmed state), but carries out a process of changing the confirmed character string "とうきょうと (toukyouto)" to the unconfirmed state. As a result, even though the user has inputted only "とうき (touki)" actually, the character input device assumes that "とうきょうと (toukyouto)" has been inputted and enables the user to promptly select a character string including "とうきょうと (toukyouto)" and subsequent characters (e.g., "とうきょうとりつ (toukyoutoritsu)"). Therefore, the character input device enables the user to carry out a character input efficiently.

As previously explained, because the character input device in accordance with this Embodiment 1 provides the function of deleting an unconfirmed inputted character which the user is currently inputting, and the function of changing a confirmed character string to the unconfirmed state to the single correction key, the character input device enables the user to carry out a character input efficiently by using limited space without requiring an excessive operation and arrangement of a new key for reconversion. Further, because when the correction key is pushed down while a character string which the user wants to correct is confirmed, the character input device does not return to the characters inputted immediately before the character string is confirmed, but changes the confirmed character string to the unconfirmed state and then displays this character string, the character input device enables the user to carry out an input of characters following the character string efficiently.

Embodiment 2

In Embodiment 2 of the present invention, a case in which each character string predicted as shown in Embodiment 1 is a mixture of Chinese and kana characters is shown. Because other structural components and operations are the same as those shown in Embodiment 1, the explanation of the other structural components and the operations will be omitted hereafter. FIG. 8 is a diagram showing an example of an operation at a time when a user inputs characters and an example of a transition of a display screen in a character input device in accordance with Embodiment 2 of the present invention. Like in the examples shown in Embodiment 1, when the user pushes down character input keys 12 of a key input unit 1 to input a character string "とうき (touki)" first (FIG. 8(a)), a character string prediction engine unit 4 predicts a character string which includes the character string "とうき (touki)" and subsequent characters and which is a mixture of Chinese and kana characters. The character string prediction engine unit then displays predicted candidates for the mixture of Chinese and kana characters (e.g., "東客デパート (toukyakudepa-to)", "東京 (toukyou)", "東京都 (toukyouto)", and "東京駅 (toukyoueki)") in keys 13 for displaying character string candidates, and enables the user to select his or her desired character string from the displayed candidates (FIG. 8(a)). At this time, the inputted character string "とうき (touki)" is in an unconfirmed state. When the user selects "東京都 (toukyouto)" from the candidates displayed, for example, "東京都 (toukyouto)" is displayed on an input character string display unit 6, and the displayed character string is placed in a confirmed state (FIG. 8(b)).

At this time, information on the confirmed character string is stored in a confirmed character string information storing unit 5, as shown in, for example, FIG. 9. In this example, the information including the representation of the confirmed character string "東京都 (toukyouto)", the phonetic information "とうきょうと (toukyouto)", the characters "とうき (touki)" inputted immediately before the character string is confirmed, the start position "1" of the representation, the string length "3" of the representation, and the phrase position "1" is stored as the information on the confirmed character string "東京 (toukyou)" through the operations shown in FIGS. 8(a) and 8(b).

FIG. 10 is a diagram showing an example of an operation at a time when the user corrects characters and an example of a transition of the display screen in the character input device in accordance with Embodiment 2 of the present invention. FIG. 10(a) shows a state in which the character string "東京都 (toukyouto)" is placed in the confirmed state through the operations shown in FIGS. 8(a) and 8(b). At this time, the character input device predicts a character string further following the confirmed character string "東京都 (toukyouto)" and acquires candidates for the character string (e.g., "千代田区 (chiyodaku)", "中央区 (chuuouku)", "港区 (minatoku)", and "新宿区 (shinjukuku)") by using a character string input processing unit 3, and displays the candidates in the keys 13 for displaying character string candidates (FIG. 10(a)). When the user wants to correct the confirmed character string "東京都 (toukyouto)" to "東京都立 (toukyoutoritsu)" and then pushes down a correction key 11, the character input device changes the previously-confirmed character string "東京都 (toukyouto)" to its phonetic information "とうきょうと (toukyouto)" and displays these characters on the input character string display unit 6 in a state in which the character string is placed in the unconfirmed state. More specifically, the character input device changes the previously-confirmed character string "東京都 (toukyouto)" to "とうきょうと (toukyouto)" in the unconfirmed state and these character are displayed (FIG. 10(b)). At this time, the character input device predicts a character string which includes the unconfirmed character string "とうきょうと (toukyouto)" and subsequent characters and which is a mixture of Chinese and kana characters by using the character string prediction engine unit 4, and acquires candidates for the character string (e.g., "東京都 (toukyouto)" and "東京都立 (toukyoutoritsu)") by using the character string input processing unit 3 to display the candidates in the keys 13 for displaying character string candidates (FIG. 10(b)). When the user then selects "東京都立 (toukyoutoritsu)" which is the character string which the user wants to input from the beginning, the character input device displays "東京都立 (toukyoutoritsu)" on the input character string display unit 6 and places this character string in the confirmed state (FIG. 10(c)). The character string prediction engine unit 4 predicts a character string further following the confirmed character string "東京都立 (toukyoutoritsu)," and the character string input processing unit 3 acquires candidates for the character string (e.g., "図書館 (toshokan)", "美術館 (bijutsukan)", and "病院 (byouin)") to display the candidates in the keys 13 for displaying character string candidates (FIG. 10(c)).

Figure 11:
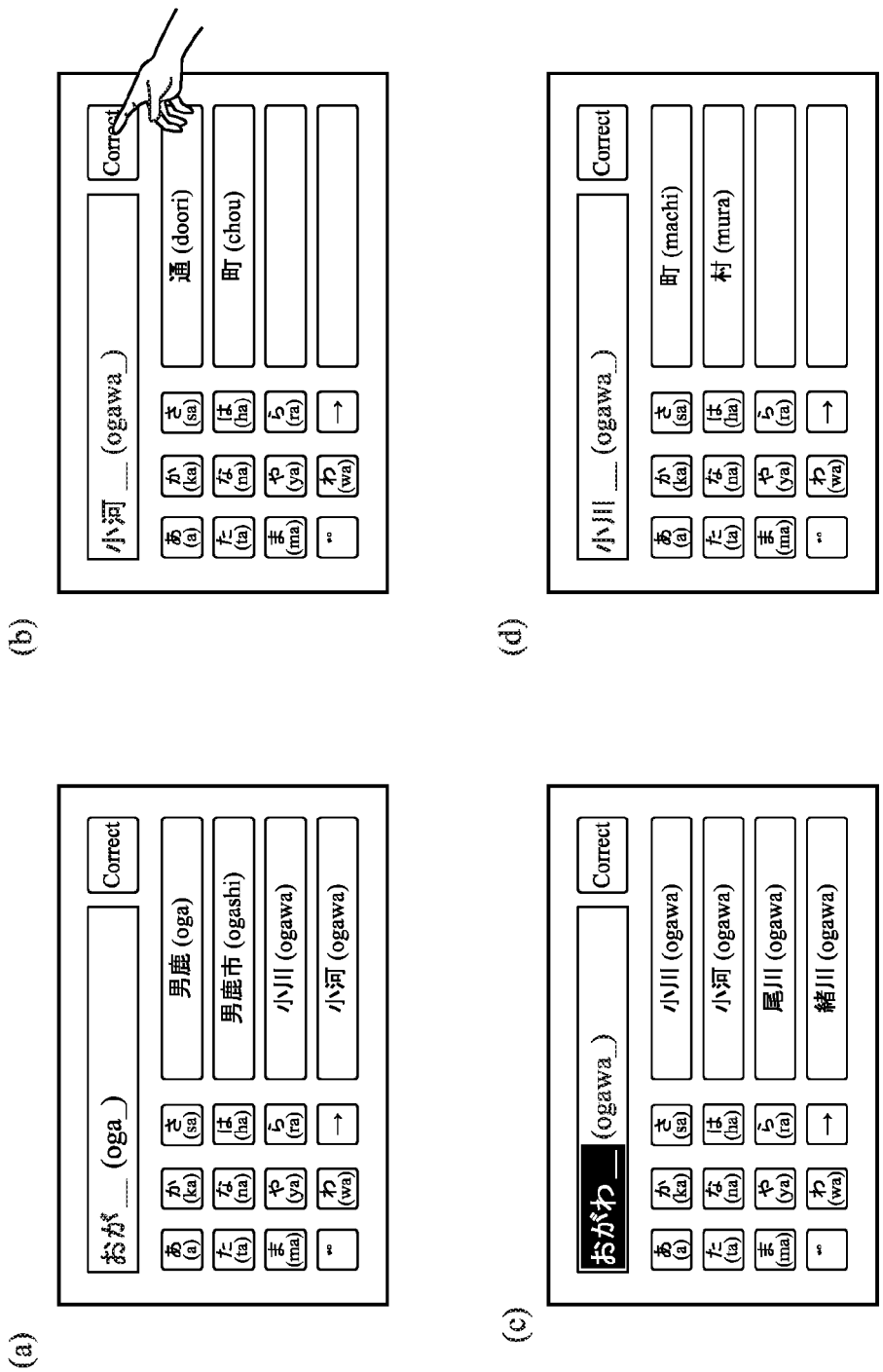
FIG. 11 is a diagram showing another example of the operation at a time when a user inputs characters and the operation at a time when a user corrects characters, and another example of a transition of the display screen in the character input device in accordance with Embodiment 2.

Further, FIG. 11 is a diagram showing another example of the operation at a time when the user inputs characters and the operation at a time when the user corrects characters, and another example of a transition of the display screen in the character input device in accordance with Embodiment 2 of the present invention. When the user pushes down character input keys 12 of the key input unit 1 to input a character string "おが (oga)" first (FIG. 11(a)), the character string prediction engine unit 4 predicts a character string which includes the character string "おが (oga)" and subsequent characters and which is a mixture of Chinese and kana characters. The character string prediction engine unit then displays predicted candidates for the mixture of Chinese and kana characters (e.g., "男鹿 (oga)", "男鹿市 (ogashi)", "小川 (ogawa)", and "小河 (ogawa)") in the keys 13 for displaying character string candidates, and enables the user to select his or her desired character string from the displayed candidates (FIG. 11(a)). At this time, the inputted character string "おが (oga)" is in the unconfirmed state. When the user then selects "小河 (ogawa)" from the candidates displayed, for example, "小河 (ogawa)" is displayed on the input character string display unit 6, and the displayed character string is placed in the confirmed state (FIG. 11(b)). At this time, the character input device predicts a character string further following the confirmed character string "小河 (ogawa)" and acquires candidates for the character string (e.g., "通 (doori)" and "町 (chou)") by using the character string input processing unit 3, and displays the candidates in the keys 13 for displaying character string candidates (FIG. 11(a)). When the user wants to correct the confirmed character string "小河 (ogawa)" to "小川 (ogawa)", such as when the user has erroneously selected "小河 (ogawa)" even though he or she really wants to select "小川 (ogawa)", not "小河 (ogawa)", and then pushes down the correction key 11, the character input device changes the previously-confirmed character string "小河 (ogawa)" to the characters "おがわ (ogawa)" in the unconfirmed state and displays these characters on the input character string display unit 6 (FIG. 11(c)). At this time, the character input device predicts a character string which includes the unconfirmed inputted character string "おがわ (ogawa)" and subsequent characters and which is a mixture of Chinese and kana characters by using the character string prediction engine unit 4, and acquires candidates for the character string (e.g., "小川 (ogawa)", "小河 (ogawa)", "尾川 (ogawa)" and "緒川 (ogawa)") by using the character string input processing unit 3 to display the candidates in the keys 13 for displaying character string candidates (FIG. 11(c)).

When there are many different Chinese character string candidates having the same sound, and the user wants to reselect a different Chinese character string having the same sound, the character input device in accordance with this Embodiment 2 enables the user to simply push down the correction key 11 to cause the character input device to promptly display different Chinese character string candidates having the same sound in the keys 13 for displaying character string candidates. Therefore, the user can promptly reselect the character string which he or she wants to input from the beginning and save the time of inputting characters, so that the user can search for a place name and a facility name efficiently. When the user then selects "小川 (ogawa)" which is the character string which the user wants to input from the beginning, the character input device displays "小川 (ogawa)" on the input character string display unit 6 and places this character string in the confirmed state (FIG. 11(d)). The character string prediction engine unit 4 predicts a character string further following the confirmed character string "小川 (ogawa)," and the character string input processing unit 3 acquires candidates for the character string (e.g., "町 (machi)" and "村 (mura)") to display the candidates in the keys 13 for displaying character string candidates (FIG. 11(d)).

As mentioned above, in accordance with this Embodiment 2, when the user has erroneously selected "東京都 (toukyouto)" to confirm this character string in a state in which the user has inputted only "とうき (touki)", as shown in, for example, FIGS. 8 and 10, and then pushes down the correction key 11, the character input device does not return to the characters inputted immediately before the character is confirmed, but carries out a process of changing the confirmed character string "東京都 (toukyouto)" to "とうきょうと (toukyouto)" in the unconfirmed state. As a result, even though the user has inputted only "とうき (touki)" actually, the character input device assumes that "とうきょうと toukyouto" has been inputted and enables the user to promptly select a character string which includes "とうきょうと (toukyouto)" and subsequent characters and which is a mixture of Chinese and kana characters (e.g., "東京都立 (toukyoutoritsu)"). Therefore, the character input device enables the user to carry out a character input efficiently. Further, when erroneously selecting and confirming "小河 (ogawa)" in a state in which the user has inputted only "おが (oga)", as shown in, for example, FIG. 11, the user is enabled to simply push down the correction key 11 to cause the character input device to change the confirmed character string "小河 (ogawa)" to "おがわ (ogawa)" in the unconfirmed state and promptly reselect "小川 (ogawa)" which is a different place name having the same sound. Therefore, there is provided another advantage of making it possible for the user to save the time of inputting characters and search for a place name and a facility name efficiently.

As previously explained, because the character input device in accordance with this Embodiment 2 provides the function of deleting an inputted character and the function of changing a confirmed character string to the unconfirmed state to the single correction key, like that in accordance with Embodiment 1, the character input device enables the user to carry out a character input efficiently by using limited space without requiring an excessive operation and arrangement of a new key for reconversion. Further, because when the correction key is pushed down while a character string which the user wants to correct is confirmed, the character input device does not return to the characters inputted immediately before the character string is confirmed, but changes the confirmed character string to the unconfirmed state and then displays this character string, the character input device enables the user to carry out an input of characters following the character string efficiently.

Embodiment 3

In Embodiment 3 of the present invention, the language used is English in the character input device in accordance with Embodiment 1. Because the other structural components and operations are the same as those of the character input device in accordance with Embodiment 1, the explanation of the other structural components and the operations will be omitted hereafter. FIG. 12 is a diagram showing an example of an operation at a time when a user inputs characters and an example of a transition of a display screen in a character input device in accordance with Embodiment 3 of the present invention. When the user pushes down character input keys 12 of a key input unit 1 to input a character string "SAN" first (FIG. 12(a)), a character string prediction engine unit 4 predicts a character string including the character string "SAN" and subsequent characters. The character string prediction engine unit displays predicted English candidates (e.g., "SAN JOSE", "SAN FRANCISCO", and "SAN FRANCISCO HOTEL") in keys 13 for displaying character string candidates, and enables the user to select his or her desired character string from the displayed candidates (FIG. 12(a)). At this time, the inputted character string "SAN" is in an unconfirmed state. In this case, when the user selects "SAN FRANCISCO" from the candidates displayed, for example, "SAN FRANCISCO" is displayed on an input character string display unit 6, and the displayed character string is placed in a confirmed state (FIG. 12(b)).

At this time, information on the confirmed character string is stored in a confirmed character string information storing unit 5, as shown in, for example, FIG. 13. In this example, information including the representation "SAN FRANCISCO" of the confirmed character string, the phonetic information "SAN FRANCISCO", the characters "SAN" inputted immediately before the character string is confirmed, the start position "1" of the representation, the string length "13" of the representation, and the phrase position "1" is stored as the information on the confirmed character string "SAN FRANCISCO" through the operations shown in FIGS. 12(a) and 12(b).

FIG. 14 is a diagram showing an example of an operation at a time when the user corrects characters and an example of a transition of the display screen in the character input device in accordance with Embodiment 3 of the present invention. FIG. 14(a) shows a state in which the character string "SAN FRANCISCO" is placed in the confirmed state through the operations shown in FIGS. 12(a) and 12(b). At this time, the character input device predicts a character string further following the confirmed character string "SAN FRANCISCO" and acquires candidates for the character string (e.g., "AIRPORT" and "LIBRARY") by using a character string input processing unit 3, and displays the candidates in the keys 13 for displaying character string candidates (FIG. 14(a)). When the user wants to correct the confirmed character string "SAN FRANCISCO" to "SAN FRANCISCO HOTEL" and then pushes down a correction key 11, the character input device displays the previously-confirmed character string "SAN FRANCISCO" on the input character string display unit 6 in a state in which the character string is changed to the unconfirmed state (FIG. 14(b)). At this time, the character input device predicts a character string including the unconfirmed character string "SAN FRANCISCO" and subsequent characters by using the character string prediction engine unit 4, and acquires candidates for the character string (e.g., "SAN FRANCISCO" and "SAN FRANCISCO HOTEL") by using the character string input processing unit 3 to display the candidates in the keys 13 for displaying character string candidates (FIG. 14(b)). When the user then selects "SAN FRANCISCO HOTEL" which is the character string which the user wants to input from the beginning, the character input device displays "SAN FRANCISCO HOTEL" on the input character string display unit 6 and places this character string in the confirmed state (FIG. 14(c)). The character string prediction engine unit 4 predicts a character string further following the confirmed character string "SAN FRANCISCO HOTEL," and the character string input processing unit 3 acquires candidates for the character string (e.g., hotel names which are expressed by "○○○" and "xxx" in the example shown in FIG. 14) to display the candidates in the keys 13 for displaying character string candidates (FIG. 14(c)).

As mentioned above, in accordance with this Embodiment 3, when the user has erroneously selected "SAN FRANCISCO" to confirm this character string in a state in which the user has inputted only "SAN", as shown in, for example, FIGS. 12 and 14, and then pushes down the correction key 11, the character input device does not return to the characters inputted immediately before the character is confirmed ("SAN" in the unconfirmed state), but carries out a process of changing the confirmed character string "SAN FRANCISCO" to the unconfirmed state. As a result, even though the user has inputted only "SAN" actually, the character input device assumes that "SAN FRANCISCO" has been inputted and enables the user to promptly select a character string including "SAN FRANCISCO" and subsequent characters (e.g., "SAN FRANCISCO HOTEL"). Therefore, the character input device enables the user to carry out a character input efficiently.

As previously explained, because the character input device in accordance with this Embodiment 3 provides the function of deleting an unconfirmed inputted character which the user is currently inputting, and the function of changing a confirmed character string to the unconfirmed state to the single correction key, like those in accordance with Embodiments 1 and 2, the character input device enables the user to carry out a character input efficiently by using limited space without requiring an excessive operation and arrangement of a new key for reconversion. Further, because when the correction key is pushed down while a character string which the user wants to correct is confirmed, the character input device does not return to the characters inputted immediately before the character string is confirmed, but changes the confirmed character string to the unconfirmed state and then displays this character string, the character input device enables the user to carry out an input of characters following the character string efficiently.

Embodiment 4

Figure 15:
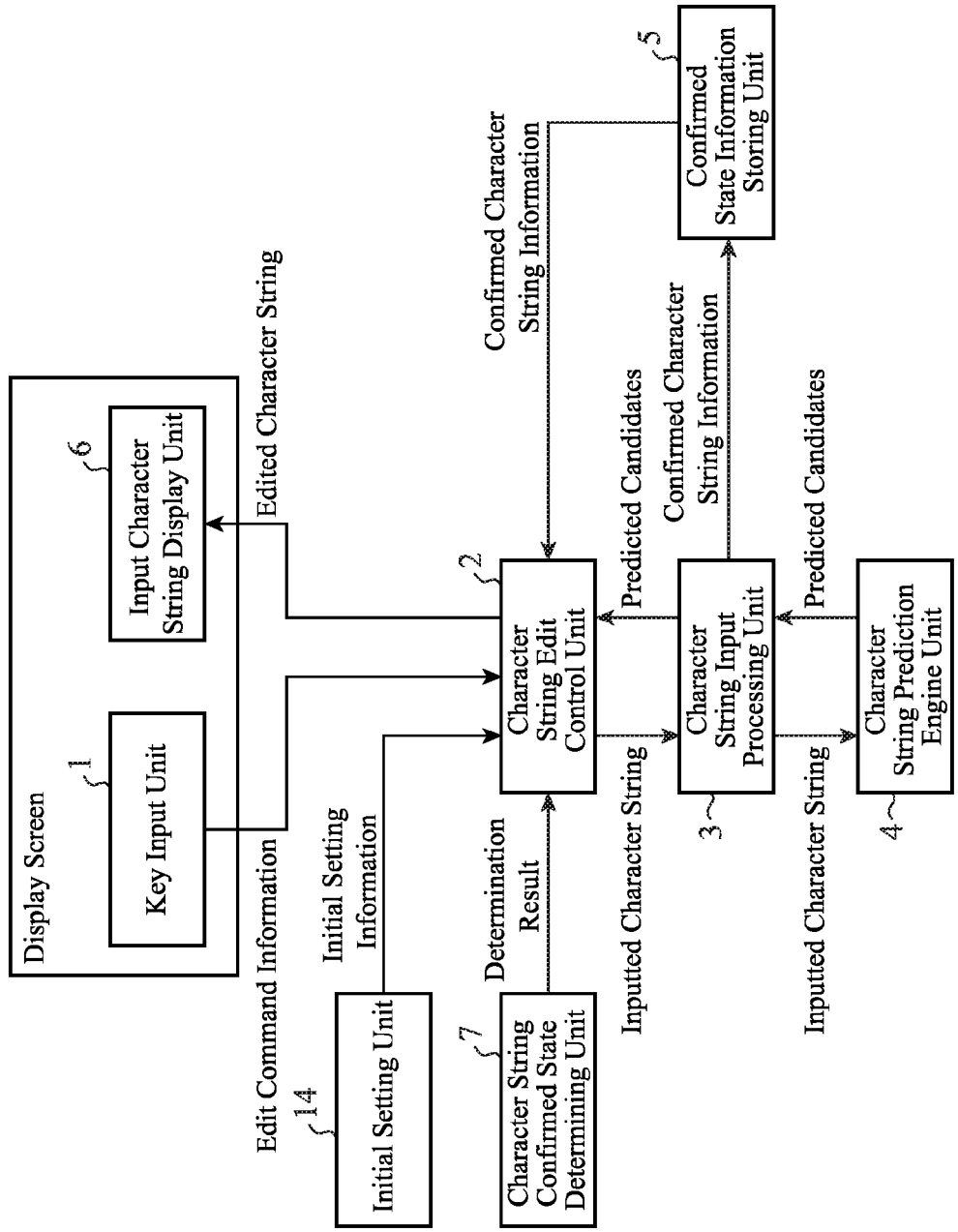
FIG. 15 is a block diagram showing the structure of a character input device in accordance with Embodiment 4.

FIG. 15 is a block diagram showing the structure of a character input device in accordance with Embodiment 4 of the present invention. In this figure, an initial setting unit 14 is added to the components shown in the block diagram showing the structure of the character input device in accordance with any one of Embodiments 1 to 3. This initial setting unit 14 provides a setting to, when an inputted character string is in a confirmed state, issue a command to change the confirmed character string to an unconfirmed state, as shown in Embodiments 1 to 3, or issue, instead of this command, a command to change the confirmed character string to the character string inputted before the character string is confirmed when a correction key 11 is pushed down. Because the other structural components of the character input device are the same as those in accordance with Embodiment 1, the explanation of the other structural components will be omitted hereafter.

Figure 16:
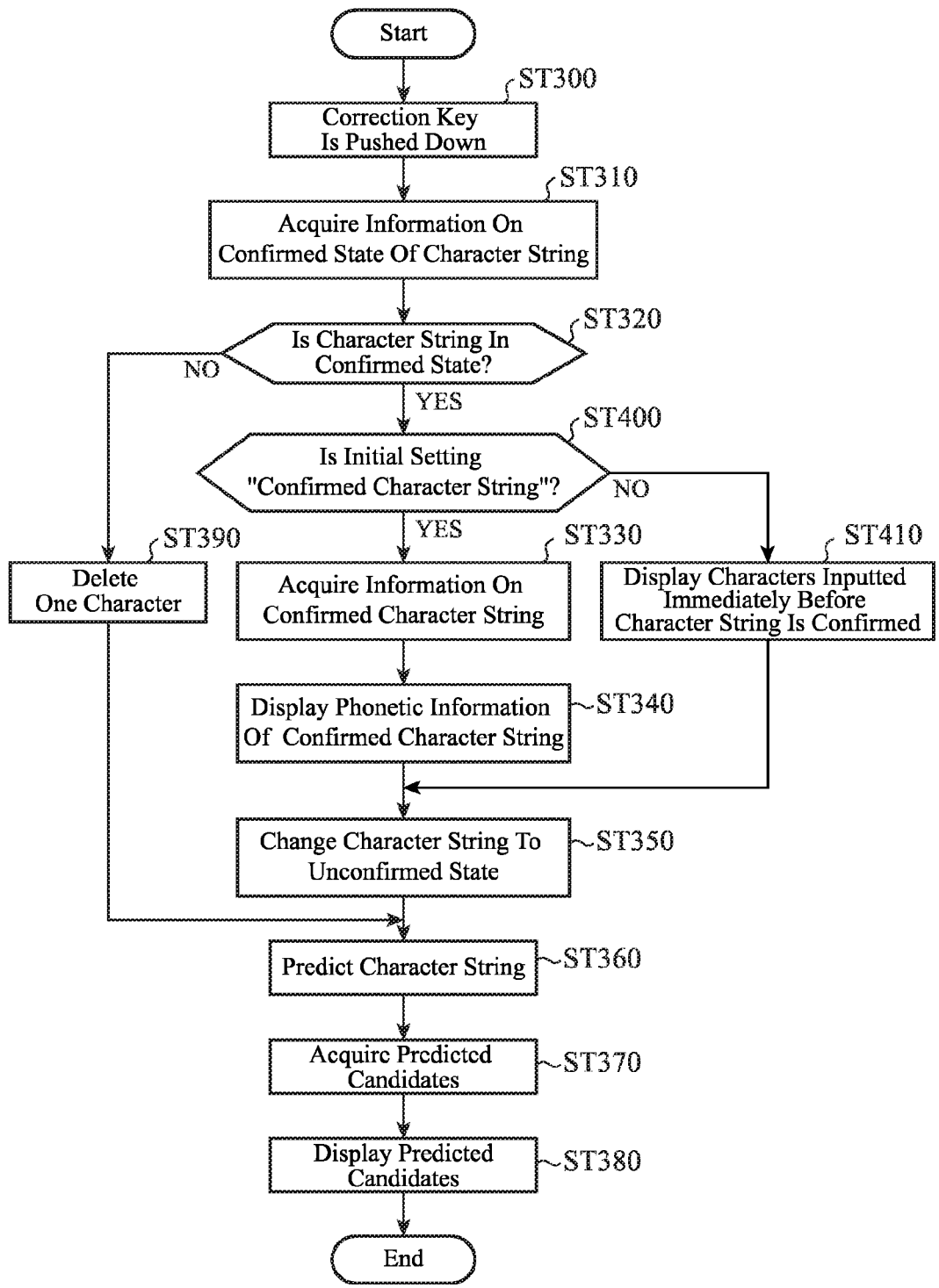
FIG. 16 is a flow chart showing a process at a time when a user corrects an inputted character string in the character input device in accordance with Embodiment 4.

Next, the operation of the character input device will be explained. FIG. 16 is a flow chart explaining a process of correcting an inputted character string in the character input device in accordance with Embodiment 4 of the present invention. In this Embodiment 4, because the flow chart of FIG. 4 shown in Embodiment 1 is simply replaced by the flow chart of FIG. 16 and other processes (a process at a time when a user inputs characters and a process at a time when the user selects one of predicted candidates) are the same as those shown in Embodiment 1 (FIG. 3), the explanation of the other processes will be omitted hereafter. Further, because an example of an operation at a time when the user inputs characters and an example of a transition of a display screen in the character input device in accordance with Embodiment 4 of the present invention are the same as those shown in Embodiment 1, the explanation of the examples will be omitted hereafter.

In this case, the initial setting unit 14 provides a setting to select either "confirmed character string" (default) or "characters inputted immediately before confirmed." When the correction key 11 is pushed down while the inputted character string is in the confirmed state (when YES in step ST320), a character string edit control unit 2 changes the confirmed character string to the unconfirmed state, as shown in Embodiments 1 to 3 (steps ST330 to ST350) when the initial setting of this initial setting unit 14 is "confirmed character string" (default) (when YES in step ST400). In contrast, when the initial setting is "characters inputted immediately before confirmed" (when NO in step ST400), and the user then pushes down the correction key 11, the character input device issues the command to change the confirmed character string to the character string inputted before the character string is confirmed, instead of the command to change the confirmed character string to the unconfirmed state, to a character string edit control unit 2, so that the character string edit control unit 2 changes the confirmed character string to the characters immediately before the character string is confirmed (unconfirmed state) (steps ST410 and ST350).

Figure 17:
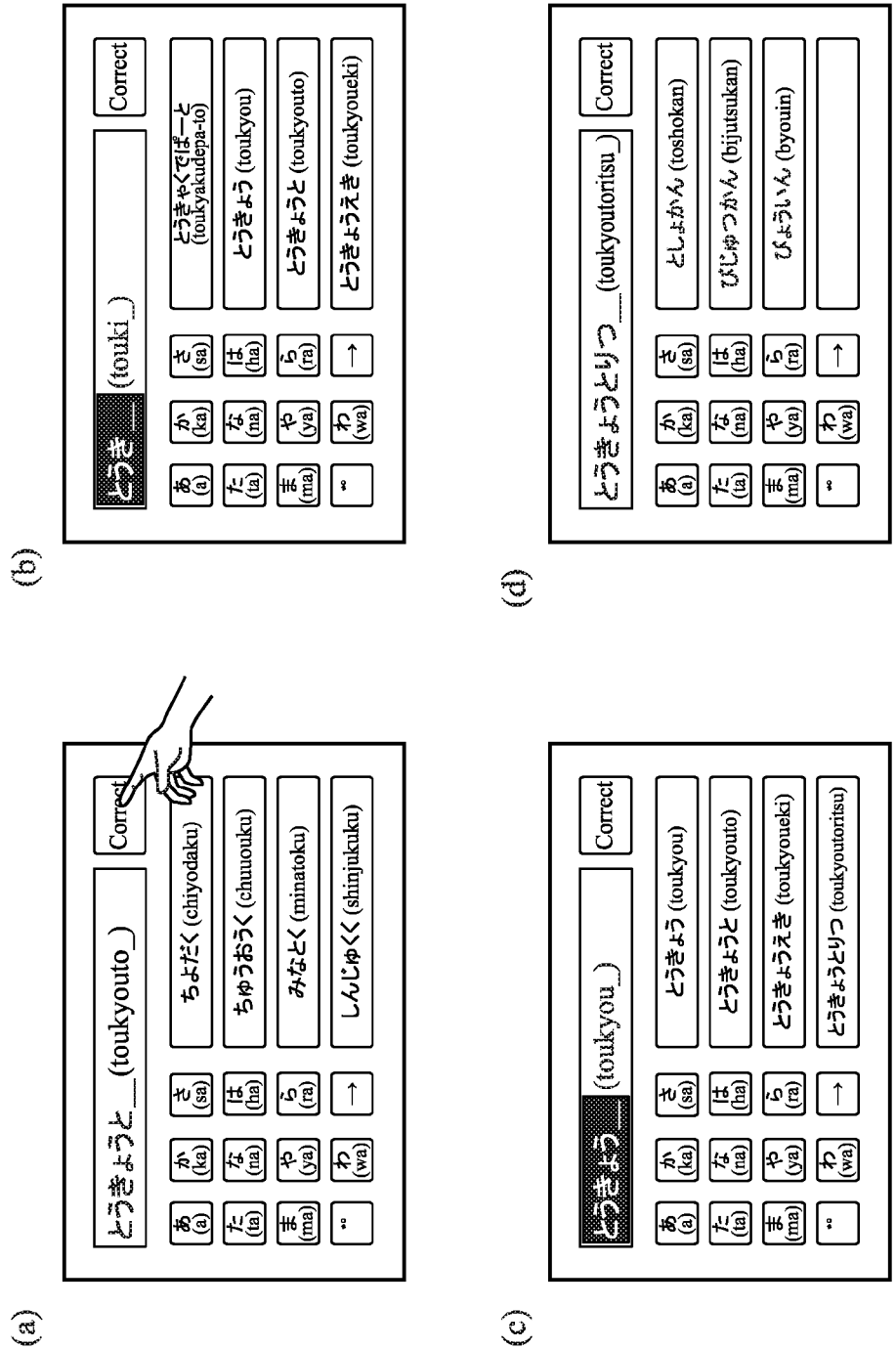
FIG. 17 is a diagram showing an example of an operation at a time when a user corrects characters and an example of a transition of a display screen when an initial setting in an initial setting unit 14 is "characters inputted immediately before confirmed" in the character input device in accordance with Embodiment 4.

FIG. 17 is a diagram showing an example of an operation at a time when the user corrects characters and an example of a transition of the display screen when the initial setting in the initial setting unit 14 is "characters inputted immediately before confirmed" (when NO in step ST400) in the character input device in accordance with Embodiment 4 of the present invention. FIG. 17(*a*) shows a state in which a character string "とうきょうと (toukyouto)" is placed in the confirmed state through the operations shown in FIGS. 5(*a*) and 5(*b*) in Embodiment 1. When the user wants to correct the confirmed character string "とうきょうと (toukyouto)" to "とうきょうとりつ (toukyoutoritsu)" and then pushes down the correction key 11, the character input device displays "とうき (touki)" (refer to FIGS. 5(*a*) and 6), which is the characters inputted immediately before the character string "とうきょうと (toukyouto)" is confirmed, on an input character string display unit 6 with "とうき (touki)" being in the unconfirmed state (FIG. 17(*b*)). At this time, because "とうきょうとりつ (toukyoutoritsu)" is not displayed in keys 13 for displaying character string candidates, when the user inputs "ょう (you)" by using character input keys 12, the character input device displays "とうきょう (toukyou)" on the input character string display unit 6 with "とうきょう (toukyou)" being in the unconfirmed state (FIG. 17(*c*)). At this time, the character input device predicts a character string including the unconfirmed character string "とうきょう (toukyou)" and subsequent characters by using a character string prediction engine unit 4, and acquires candidates for the character string (e.g., "とうきょう (toukyou)", "とうきょうと (toukyouto)", "とうきょうえき (toukyoueki)", and "とうきょうとりつ (toukyoutoritsu)") by using a character string input processing unit 3 to display the candidates in the keys 13 for displaying character string candidates (FIG. 17(*c*)). When the user then selects "とうきょうとりつ (toukyoutoritsu)" which is the character string which the user wants to input from the beginning, the character input device displays "とうきょうとりつ (toukyoutoritsu)" on the input character string display unit 6 and places this character string in the confirmed state (FIG. 17(*d*)).

In this case, although an operation of additionally inputting two characters "ょう (you)" is added in order to switch from the state shown in FIG. 17(*b*) to the state shown in FIG. 17(*c*) as compared with the case (FIG. 7 of Embodiment 1) in which the initial setting in the initial setting unit 14 is "confirmed character string," when the user wants to select "とうきゃくでぱーと (toukyakudepa-to)", but erroneously selects "とうきょうと (toukyouto)," for example, an operation of deleting three characters "ょうと (youto)" in the state shown in FIG. 7(*b*) is needed in the case of using the character input device in accordance with Embodiment 1 (FIG. 7). In contrast with this, the character input device in accordance with this Embodiment 4 enables the user to promptly select "とうきゃくでぱーと (toukyakudepa-to)" in the state shown in FIG. 17(*b*) and save the time of inputting characters, and cause the character input device to carry out reconversion efficiently.

Figure 18:
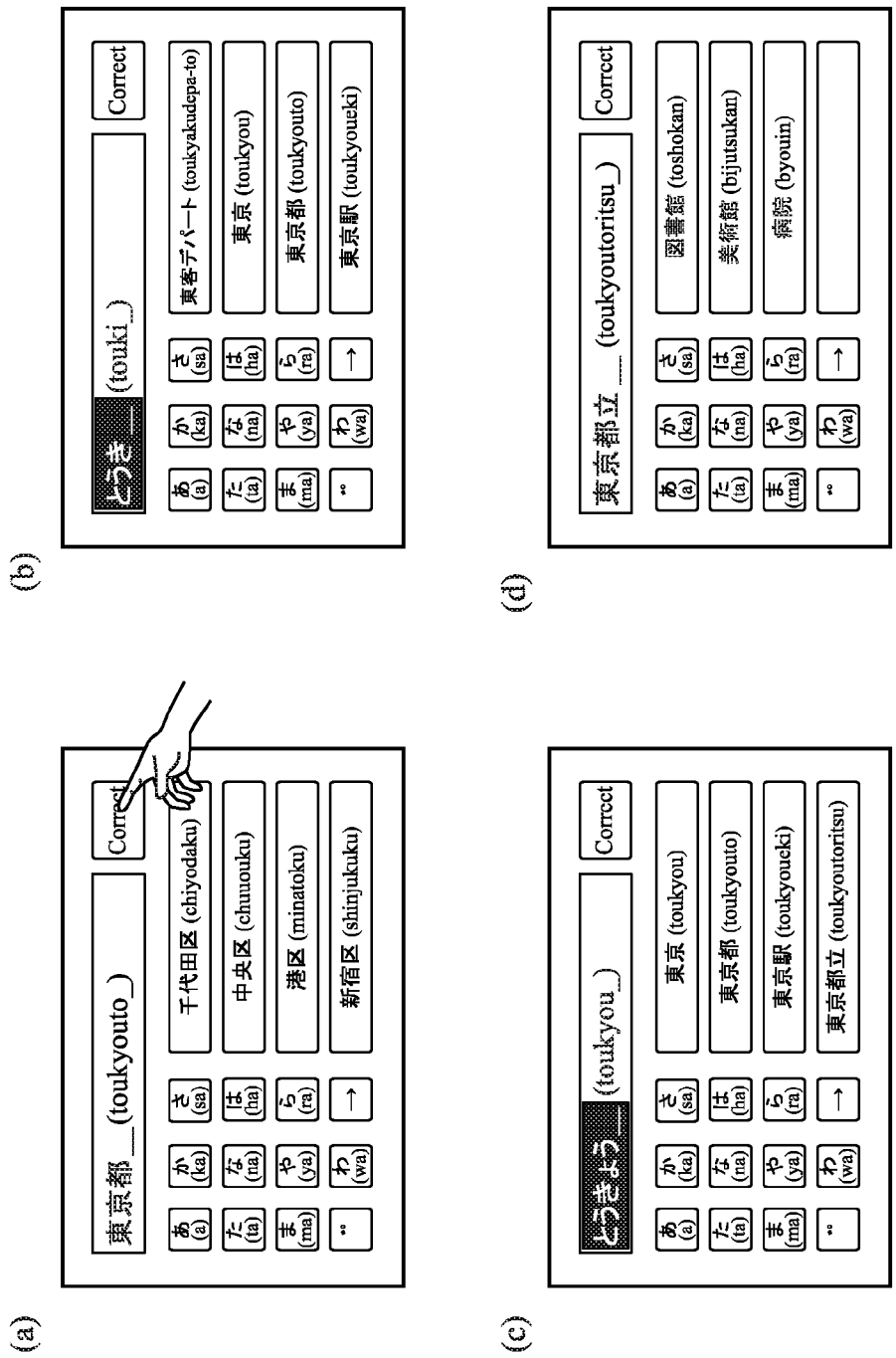
FIG. 18 is a diagram showing an example of an operation at a time when a user corrects characters and another example (when the character string is a mixture of Chinese and kana characters) of a transition of the display screen when the initial setting in the initial setting unit 14 is "characters inputted immediately before confirmed" in the character input device in accordance with Embodiment 4.

FIG. 18 is a diagram showing an example of an operation at a time when the user corrects characters and another example (when the character string is a mixture of Chinese and kana characters) of a transition of the display screen when the initial setting in the initial setting unit 14 is "characters inputted immediately before confirmed" (when NO in step ST400) in the character input device in accordance with Embodiment 4 of the present invention. FIG. 18(*a*) shows a state in which the character string "東京都 (toukyouto)" is placed in the confirmed state through the operations shown in FIGS. 8(*a*) and 8(*b*) in Embodiment 2. When the user wants to correct the confirmed character string "東京都 (toukyouto)" to "東京都立 (toukyoutoritsu)" and then pushes down the correction key 11, the character input device displays "とうき (touki)" (refer to FIGS. 8(*a*) and 9), which is the characters inputted immediately before the character string "東京都 (toukyouto)" is confirmed, on the input character string display unit 6 with "とうき (touki)" being in the unconfirmed state (FIG. 18(*b*)). At this time, because "東 京都立 (toukyoutoritsu)" is not displayed in the keys 13 for displaying character string candidates, when the user inputs "ょう (you)" by using the character input keys 12, the character input device displays "とうきょう (toukyou)" on the input character string display unit 6 with "とうきょう (toukyou)" being in the unconfirmed state (FIG. 18(*c*)). At this time, the character input device predicts a character string which includes the unconfirmed character string "とうきょう (toukyou)" and subsequent characters and which is a mixture of Chinese and kana characters by using the character string prediction engine unit 4, and acquires candidates for the character string (e.g., "東京 (toukyou)", "東京都 (toukyouto)", "東京駅 (toukyoueki)", and "東京都立 (toukyoutoritsu)") by using the character string input processing unit 3 to display the candidates in the keys 13 for displaying character string candidates (FIG. 18(*c*)). When the user then selects "東京都立 (toukyoutoritsu)" which is the character string which the user wants to input from the beginning, the character input device displays "東京都 立 (toukyoutoritsu)" on the input character string display unit 6 and places this character string in the confirmed state (FIG. 17(*d*)).

In this case, although an operation of additionally inputting two characters "ょう (you)" is added in order to switch from the state shown in FIG. 18(*b*) to the state shown in FIG. 18(*c*) as compared with the case (FIG. 10 shown in Embodiment 2) in which the initial setting in the initial setting unit 14 is "confirmed character string," when the user wants to select "東客デパート (toukyakudepa-to)", but erroneously selects "東京都 (toukyouto)," for example, an operation of deleting three characters "ょうと (youto)" in the state shown in FIG. 10(*b*) is needed in the case of using the character input device in accordance with Embodiment 2 (FIG. 10). In contrast with this, the character input device in accordance with this Embodiment 4 enables the user to promptly select "東客デパート (toukyakudepa-to)" in the state shown in FIG. 18(*b*) and save the time of inputting characters, and cause the character input device to carry out reconversion efficiently.

FIG. 19 is a diagram showing an example of an operation at a time when the user corrects characters and another example (when the character string is an English one) of a transition of the display screen when the initial setting in the initial setting unit 14 is "characters inputted immediately before confirmed" (when NO in step ST400) in the character input device in accordance with Embodiment 4. FIG. 18(*a*) shows a state in which the character string "SAN FRANCISCO" is placed in the confirmed state through the operations shown in FIGS. 12(*a*) and 12(*b*) in Embodiment 3. When the user wants to correct the confirmed character string "SAN FRANCISCO" to "SAN FRANCISCO HOTEL" and then pushes down the correction key 11, the character input device displays "SAN" (refer to FIGS. 12(*a*) and 13), which is the characters inputted immediately before the character string "SAN FRANCISCO" is confirmed, on the input character string display unit 6 with "SAN" being in the unconfirmed state (FIG. 19(*b*)). At this time, because "SAN FRANCISCO HOTEL" is displayed in the keys 13 for displaying character string candidates, the character input device enables the user to promptly select "SAN FRANCISCO HOTEL" from the displayed candidates, and, when "SAN FRANCISCO HOTEL" is selected, displays "SAN FRANCISCO HOTEL" on the input character string display unit 6 and places this character string in the confirmed state (FIG. 19(*c*)).

In this case, as compared with the case (FIG. 14 shown in Embodiment 3) in which the initial setting in the initial setting unit 14 is "confirmed character string," while the character string displayed on the input character string display unit 6 differs from the character strings displayed in the keys 13 for displaying character string candidates (the transition of the screen differs between in the case of FIG. 14(*b*) and in the case of FIG. 19(*b*)), the user is enabled to simply push down the correction key 11 to promptly select "SAN FRANCISCO HOTEL" which the user wants to select from the beginning in either of the cases. Therefore, the character input device in accordance with this embodiment enables the user to save the time of inputting characters, and can carry out reconversion efficiently.

As mentioned above, because by providing a setting to switch to either of the following two states: "confirmed character string" (default) and "characters inputted immediately before confirmed" by using the initial setting unit 14 when the user corrects the confirmed character string by using the correction key 11, the character input device in accordance with this Embodiment 4 can provide a setting to issue the command to change the confirmed character string to the unconfirmed state, as shown in Embodiments 1 to 3 (FIGS. 7, 10, and 14), or issue, instead of this command, the command to change the confirmed character string to the character string inputted before the character string is confirmed, as shown in FIGS. 17, 18, and 19, according to the user's needs, the character input device enables the user to carry out an input of characters more efficiently. The character input device can be constructed in such a way as to enable the user to set the initial setting to the initial setting unit 14 by performing a certain setup by pushing down certain keys, such as a combination of a character input key and the correction key, or by operating a hard switch or the like. When there is key space in the display screen, the character input device can be constructed in such a way as to provide any means, such as an initial setting key, for enabling the user to set the initial setting to the initial setting unit 14.

As previously explained, because the character input device in accordance with this Embodiment 4 provides the function of deleting an unconfirmed inputted character which the user is currently inputting, and the function of issuing the command to change the confirmed character string to the unconfirmed state, or issuing, instead of this command, the command to change the confirmed character string to the character string inputted before the character string is confirmed to the single correction key, the character input device enables the user to carry out a character input efficiently by using limited space without requiring arrangement of a new key for reconversion. Further, because the character input device can set up a process to be performed after the correction key is pushed down when a character string which the user wants to correct is confirmed according to the user's needs, the user can carry out an input of characters more efficiently.

Embodiment 5

Figure 20:
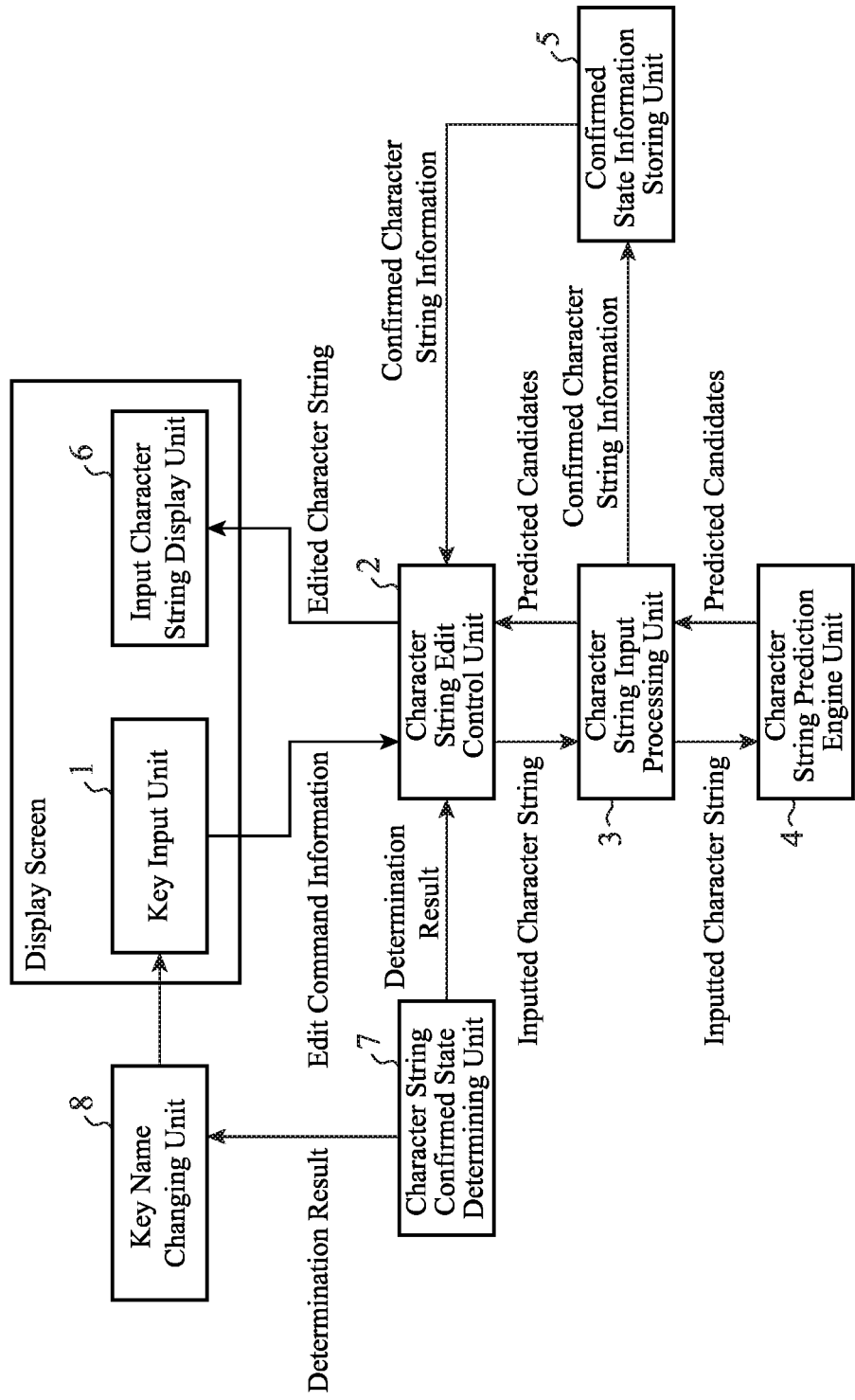
FIG. 20 is a block diagram showing the structure of a character input device in accordance with Embodiment 5.

FIG. 20 is a block diagram showing the structure of a character input device in accordance with Embodiment 5 of the present invention. In the character input device, a key name changing unit 8 is added to the structural components in accordance with Embodiment 1 (FIG. 1). Because the other structural components of the character input device are the same as those in accordance with Embodiment 1, the explanation of the other structural components will be omitted hereafter. When a character string displayed on an input character string display unit 6 is in a confirmed state, the key name changing unit 8 changes a display of a correction key 11 to, for example, "Change" or "Return." In contrast, when the character string is in an unconfirmed state, the key name changing unit changes the display of the correction key to, for example, "Correct" or "Delete." In this example, because the key name changing unit does not have to change the display of the correction key 11 when changing the display of the correction key 11 to "Correct", the key name changing unit has only to change the display of the correction key 11 only when the character string is in the confirmed state.

Figure 21:
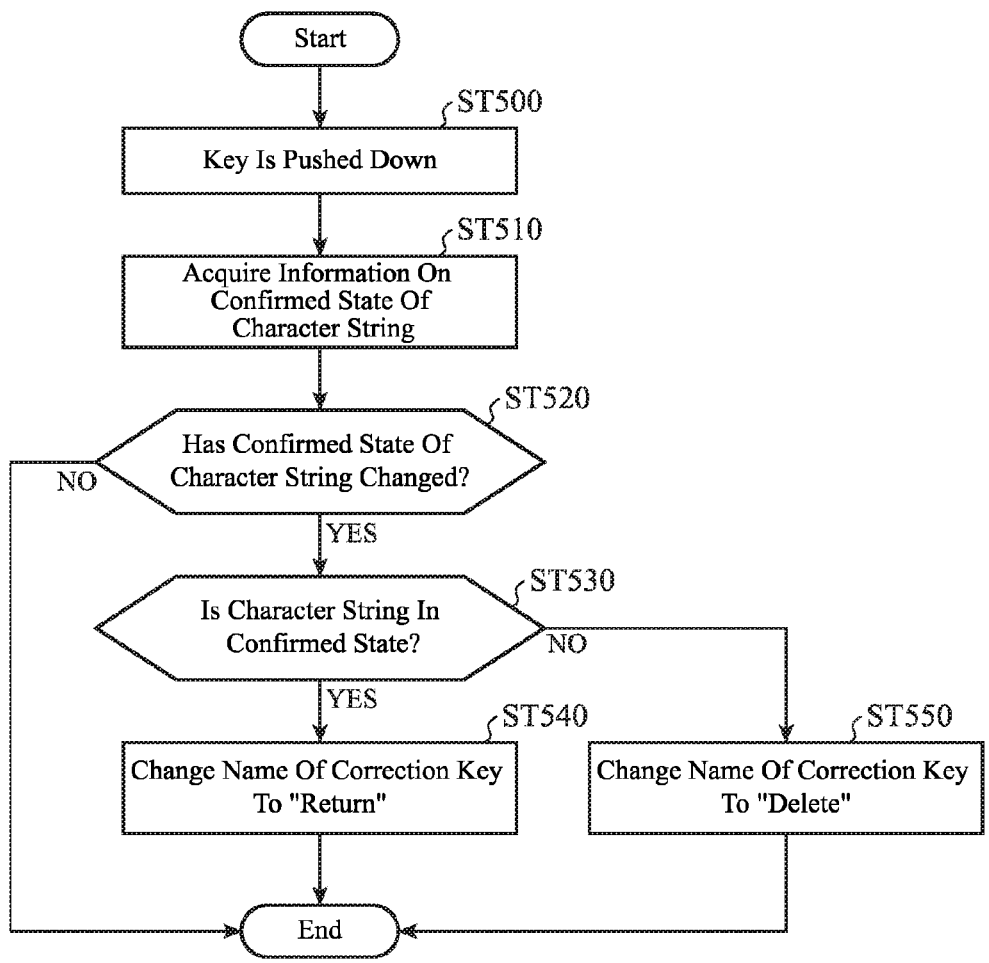
FIG. 21 is a flow chart explaining a process of changing a key name of a correction key 11 in the character input device in accordance with Embodiment 5.

Next, the operation of the character input device will be explained. FIG. 21 is a flow chart explaining the process of changing the key name of the correction key 11 in the character input device in accordance with Embodiment 5 of the present invention. Although a process at a time when a character string is inputted and a process of correcting an inputted character string in accordance with this Embodiment are the same as those in accordance with Embodiment 1 (FIGS. 3 and. 4), the process shown in the flow chart of FIG. 21 is carried out in parallel to the processes. First, when one key of a key input unit 1 is pushed down (step ST500), the key name changing unit 8 acquires information on the confirmed state of the character string from a character string confirmed state determining unit 7 (step ST510). Then, when the input state (the confirmed state of the character string) changes from that at the time of a previous key pushdown (when YES in step ST520), and the current input state is the confirmed state (when YES in step ST530), the key name changing unit changes the name of the correction key 11 to "Return" (step ST540). In contrast, when the input state (the confirmed state of the character string) changes from that at the time of a previous key pushdown (when YES in step ST520), and the current input state is the unconfirmed state (when NO in step ST530), the key name changing unit changes the name of the correction key 11 to "Delete" (step ST550). Further, when the input state (the confirmed state of the character string) does not change from that at the time of a previous key pushdown (when NO in step ST520), the key name changing unit does nothing. The new name of the correction key 11 to which the key name changing unit changes the old name in step ST540 can be "Change" or "Reconvert," instead of "Return," and can be "Back" or the like in the case of English.

As mentioned above, because the character input device in accordance with this Embodiment 5 can display the descriptions of the process at a time of pushdown, showing what kind of process will be carried out when the user pushes down the correction key, by using the key name, the character input device can prevent the user from performing an erroneous operation.

Embodiment 6

A character input device in accordance with Embodiment 6 of the present invention is constructed in such a way as to enable a user to select a character string which the user wants to correct when a plurality of confirmed character strings are displayed on an input character string display unit 6. Because the other structural components of the character input device are the same as those in accordance with Embodiment 1, the explanation of the other structural components will be omitted hereafter. The input character string display unit 6 in accordance with this Embodiment 6 is constructed in such a way as to, when the user touches a character displayed, transmit information on the position of the character within a character string displayed to a character string edit control unit 2. Further, the character string edit control unit 2 is constructed in such a way as to highlight the character string selected by the user by, for example, focusing on the character string, and display the highlighted character string on the input character string display unit 6.

Figure 22:
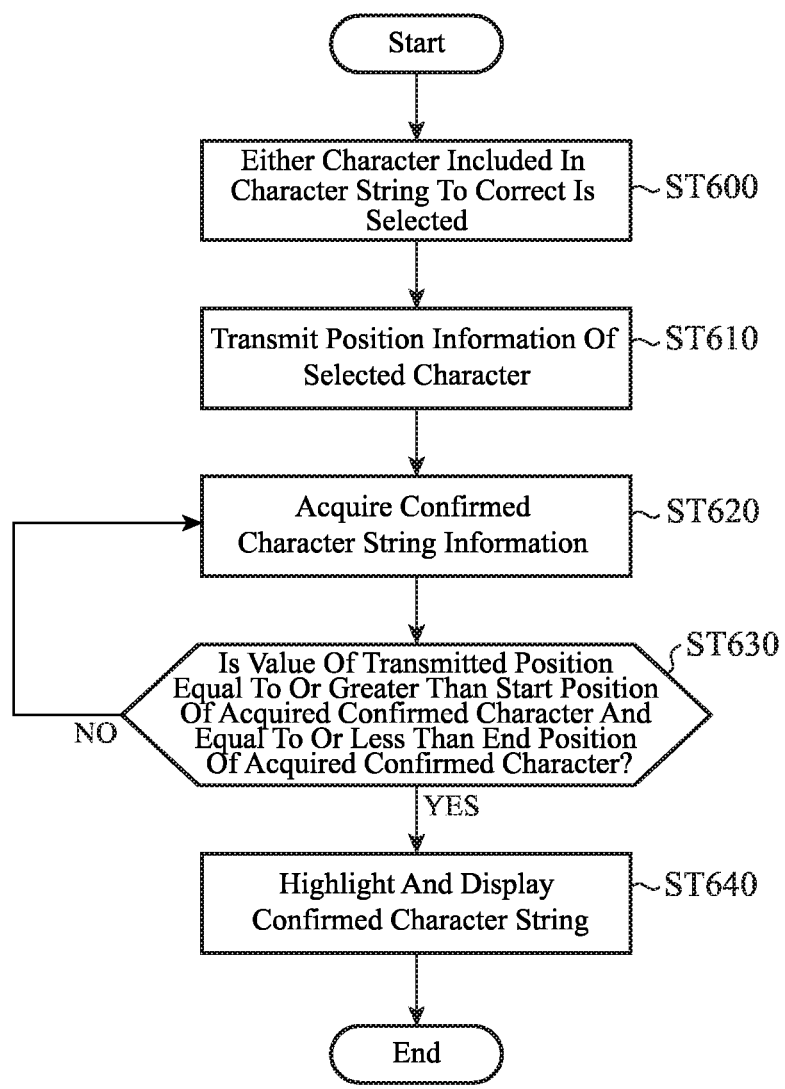
FIG. 22 is a flow chart explaining a process at a time when a user selects a character string which he or she wants to correct in a character input device in accordance with Embodiment 6.
Figure 25:
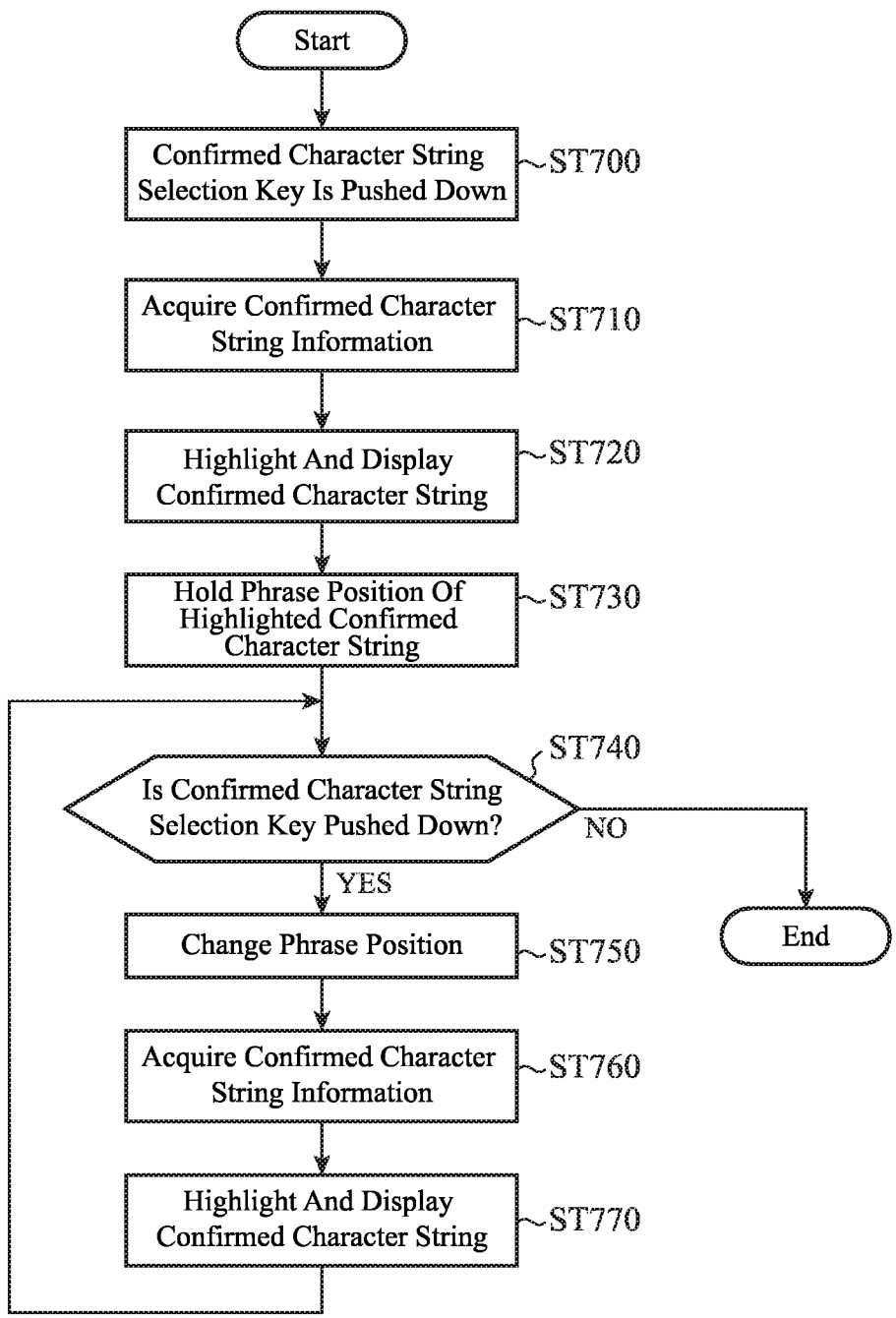
FIG. 25 is a flow chart explaining a process at a time when a user selects a character string which he or she wants to correct in a character input device in accordance with Embodiment 7.

Next, the operation of the character input device will be explained. FIGS. 22 and 23 are flow charts showing a process which is performed when the user selects a character string which he or she wants to correct, and a diagram showing an operation transition at that time. In this embodiment, it is assumed that the user inputs the following character strings: "東京都 (toukyouto)", "千代田区 (chiyodaku)", "霞が関 (kasumigaseki)", and "一丁目 (icchoume)" in this order, and all the character strings are in a confirmed state (FIG. 23(*a*)). The descriptions of confirmed character string information stored in a confirmed character string information storing unit 5 at this time are shown in FIG. 24. In this example, a representation "東京都 (toukyouto)". phonetic information "とうきょうと (toukyouto)", inputted characters "とうき (touki)" inputted immediately before the character string is confirmed, the start position "1" of the representation, the string length "3" of the representation, and the phrase position "1", as information on the confirmed character string "東京都 (toukyouto)", a representation "千代田区 (chiyodaku)", phonetic information "ちよだく (chiyodaku)", inputted characters "ちよ (chiyo)" inputted immediately before the character string is confirmed, the start position "4" of the representation, the string length "4" of the representation, and the phrase position "2", as information on the confirmed character string "千代田区 (chiyodaku)", a representation "霞が関 (kasumigaseki)", phonetic information "かすみがせき (kasumigaseki)", inputted characters "かすみ (kasumi)" inputted immediately before the character string is confirmed, the start position "8" of the representation, the string length "3" of the representation, and the phrase position "3", as information on the confirmed character string "霞が関 (kasumigaseki)", a representation "一丁目 (icchoume)", phonetic information "いっちょうめ (icchoume)", inputted characters "いっちょ (iccho)" inputted immediately before the character string is confirmed, the start position "11" of the representation, the string length "3" of the representation, and the phrase position "4", as information on the confirmed character string "一丁目 (icchoume)", are stored as pieces of already-inputted and confirmed character string information.

It is assumed that the user wants to correct the inputted character string "東京都千代田区霞が関一丁目 (toukyoutochiyodakukasumigasekiicchoume)" to "東京都千代田区永田町一丁目 (toukyoutochiyodakunagatachouicchoume)."

First, the user is enabled to select one of the characters included in the confirmed character string which he or she wants to correct (step ST600). In this example, because the user wants to correct the confirmed character string "霞が関 (kasumigaseki)", it is assumed that the user selects the character position of "が (ga)" by, for example, touching a point close to the center of the character string "霞が関 (kasumigaseki)" (FIG. 23(*a*)). The input character string display unit 6 transmits the position information on the selected character within the confirmed character string displayed to the character string edit control unit 2 (step ST610). In this case, because "が (ga)" is the ninth character within the inputted character string "東京都千代田区霞が関一丁目 (toukyoutochiyodakukasumigasekiicchoume)", "9" is transmitted as the character position information. The character string edit control unit 2 acquires the first confirmed character string information from the confirmed character string information storing unit 5 (step ST620), and determines whether or not the value of the position transmitted thereto is equal to or greater than that of the start position of the confirmed character string and is equal to or less than that of the end position of the confirmed character string (step ST630). When the value of the transmitted position is equal to or greater than that of the start position of the confirmed character string and is equal to or less than that of the end position of the confirmed character string (when YES in step ST630), the character string edit control unit 2 highlights and displays the confirmed character string on the input character string display unit 6 (step ST640). In contrast, when the value of the transmitted position is not equal to or greater than that of the start position of the confirmed character string and is not equal to or less than that of the end position of the confirmed character string (when NO in step ST630), the character string edit control unit acquires the next confirmed character string information from the confirmed character string information storing unit 5 (step ST620).

In this example, the character string edit control unit, in step ST620, acquires the information on "東京都 (toukyouto)" shown in FIG. 24 first. Because the start position of this character string is "1" and the end position of the character string is "3", the character string does not include the character "が (ga)" having the character position information "9." Therefore, the character string edit control unit then acquires the information on "千代田区 (chiyodaku)." Because the start position of this character string is "4" and the end position of the character string is "7", the character string does not include the character "が (ga)" having the character position information "9." Therefore, the character string edit control unit further acquires the information on "霞が関 (kasumigaseki)." Because the start position of this character string is "8" and the end position of the character string is "10", the character string determines that the character string includes the character "が (ga)" having the character position information "9." Therefore, the character input device highlights "霞が関 (kasumigaseki)" on the input character string display unit 6 by focusing on this character string (FIG. 23(b)). As a method of highlighting the character string, the character input device can change the color of the character string, for example, instead of focusing on the character string as shown in FIG. 23(b). When the user then pushes down a correction key 11 in this state, the character input device changes the display of the selected confirmed character string from "霞 が 関 (kasumigaseki)" to "かすみがせき (kasumigaseki)" and then places this character string in an unconfirmed state (FIG. 23(c)). Because the character input device can carry out a subsequent process of correcting the character string by simply using the method according to either one of Embodiments 1 to 4, the explanation of the process will be omitted hereafter.

In this embodiment, for the sake of clarity in explanation, the case in which a plurality of character strings are confirmed is explained. Further, the present embodiment can also be applied to even a case in which one character string is confirmed, as shown in the examples of the operations in accordance with Embodiments 1 to 4.

As mentioned above, because when one or more character strings are confirmed, the character input device in accordance with this Embodiment 6 holds all the information on the confirmed character strings even after all the character strings have been confirmed, the character input device enables the user to arbitrarily select a character string which the user wants to correct at anytime, and re-edit only the portion.

Embodiment 7

Figure 26:
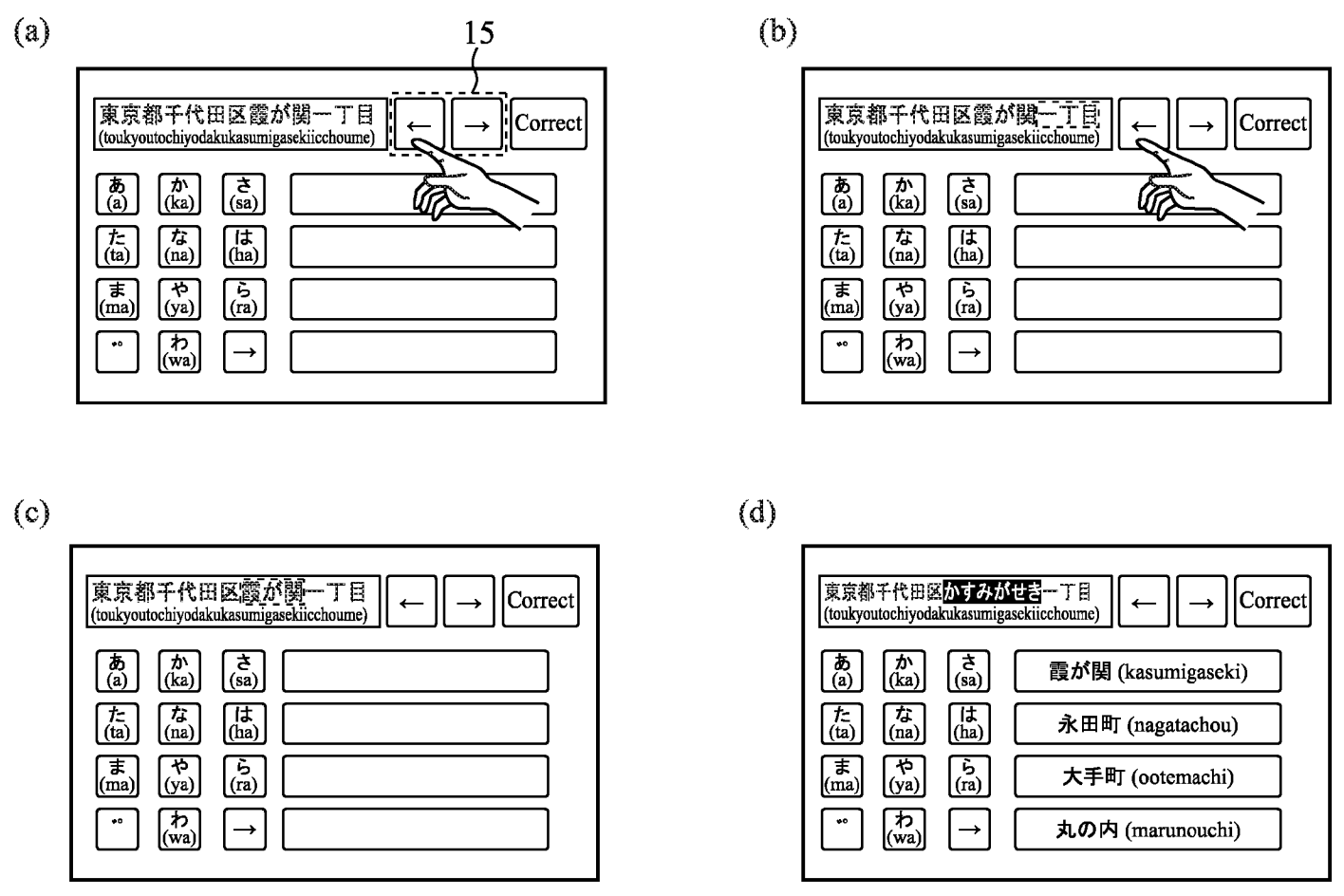

A character input device in accordance with Embodiment 7 of the present invention is constructed in such a way as to, when a plurality of confirmed character strings are displayed on an input character string display unit 6, enable a user to select a character string which the user wants to correct by using confirmed character string selection keys 15. More specifically, in the character input device in accordance with this Embodiment 7, the confirmed character string selection keys 15 are added as keys included in a key input unit 1. For example, these confirmed character string selection keys 15 are displayed as "←" and "→", as shown in FIG. 26(a), and, when the user pushes down "←", the character input device selects the confirmed character string in the phrase located immediately before the confirmed character string currently being selected. Further, when the user pushes down "→", the character input device selects the confirmed character string in the phrase located immediately after the confirmed character string currently being selected. More specifically, the character input device enables the user to select the confirmed character string which the user wants to correct by pushing down the confirmed character string selection keys 15. Because the other structural components of the character input device are the same as those in accordance with Embodiment 1, the explanation of the other structural components will be omitted hereafter. In the character input device in accordance with this Embodiment 7, when the user pushes down the confirmed character string selection keys 15 to select a character string, the input character string display unit 6 transmits information on the position of the phrase of the selected character string within the character strings currently being displayed to a character string edit control unit 2. Further, the character string edit control unit 2 is constructed in such a way as to highlight the character string selected by the user by, for example, focusing on the character string, and display the highlighted character string on the input character string display unit 6, like that in accordance with Embodiment 6.

Next, the operation of the character input device will be explained. FIGS. 22 and 23 are flow charts showing a process which is performed when the user selects a character string which he or she wants to correct by using the confirmed character string selection keys 15, and a diagram showing an operation transition at that time. Also in this embodiment, it is assumed that the user inputs the following character strings: "東京都 (toukyouto)", "千代田区 (chiyodaku)", "霞が関 (kasumigaseki)", and "一丁目 (icchoume)" in this order, and all the character strings are in a confirmed state (FIG. 26(a)), like in the case of Embodiment 6. Because the descriptions of confirmed character string information stored in a confirmed character string information storing unit 5 at this time are the same as those shown in FIG. 24 explained in Embodiment 6, the explanation of the descriptions will be omitted hereafter.

It is assumed that the user wants to correct the inputted character strings "東京都千代田区霞が関一丁目 (toukyoutochiyodakukasumigasekiicchoume)" to "東京都千代田区永田町一丁目 (toukyoutochiyodakunagatachouicchoume)", like in the case of Embodiment 6. First, when the user pushes down one of the confirmed character string selection keys 15 (step ST700), the character string edit control unit 2 acquires confirmed character string information from the confirmed character string information storing unit 5 (step ST710). The confirmed character string information acquired at this time can be the information on the confirmed character string in the first phrase or the information on the confirmed character string in the last phrase. The character string edit control unit 2 then highlights the confirmed character string acquired thereby, and displays this highlighted character string on the input character string display unit 6 (step ST720). At this time, the character string edit control unit 2 holds the phrase position (step ST730). When one of the confirmed character string selection keys 15 is then pushed down (when YES in step ST740), the character string edit control unit 2 changes the value of the phrase position held thereby (step ST750), and the character string edit control unit 2 acquires the confirmed character string information including the changed phrase position information (step ST760). After that, the character string edit control unit 2 highlights the confirmed character string acquired thereby, and displays this highlighted character string on the input character string display unit 6 (step ST770). The character string edit control unit further determines whether or not one of the confirmed character string selection keys 15 is pushed down (step ST740), and, when one of the confirmed character string selection keys is pushed down, repeats the processes of steps ST750 to ST770. In contrast, when the confirmed character string highlighted in step ST720 or ST770 is the character string which the user wants to correct, because the confirmed character string selection keys 15 are not pushed down after that (when NO in step ST740), the character string edit control unit ends the processing.

In this example, when the user pushes down "←" or "→" (one of the confirmed character string selection keys 15) while no character string is selected, the character string edit control unit acquires the information on the "一丁目 (icchoume)" which is the confirmed character string in the last phrase, for example, and highlights and displays the confirmed character string "一丁目 (icchoume)" by focusing on this character string (FIG. 26(b)). As a method of highlighting the character string, the character input device can change the color of the character string, for example, instead of focusing on the character string as shown in FIG. 26(b). At this time, the character string edit control unit 2 holds the phrase position "4" of the confirmed character string "一丁目 (icchoume)." When the user pushes down "←" in this state, the character string edit control unit changes the phrase position "4" held by the character string edit control unit 2 to the immediately preceding phrase position "3", and then acquires the confirmed character string information at the phrase position "3" (the information on the confirmed character string "霞が関 (kasumigaseki)"). As a result, the character string edit control unit focuses on the confirmed character string "霞が関 (kasumigaseki)" (FIG. 26(b)). When the user then pushes down a correction key 11 in this state, the character string edit control unit changes the display of the selected confirmed character string from "霞が関 (kasumigaseki)" to "かすみがせき (kasumigaseki)" and then places this character string in an unconfirmed state (FIG. 26(c)). Because the character input device can carry out a subsequent process of correcting the character string by simply using the method in accordance with either one of Embodiments 1 to 4, the explanation of the process will be omitted hereafter.

In this embodiment, for the sake of clarity in explanation, the case in which a plurality of character strings are confirmed is explained. Further, the present embodiment can also be applied to even a case in which one character string is confirmed, as shown in the examples of the operations in accordance with Embodiments 1 to 4.

As mentioned above, because when one or more character strings are confirmed, the character input device in accordance with this Embodiment 7 holds all the information on the one or more confirmed character strings even after all of the one or more character strings have been confirmed, like that in accordance with this Embodiment 6, the character input device enables the user to arbitrarily select a character string which the user wants to correct at any time, and re-edit only the portion. Further, the character input device enables the user to arbitrarily select a character string which he or she wants to correct while identifying which units in the inputted character string have been recognized as character strings.

Embodiment 8

Figure 27:
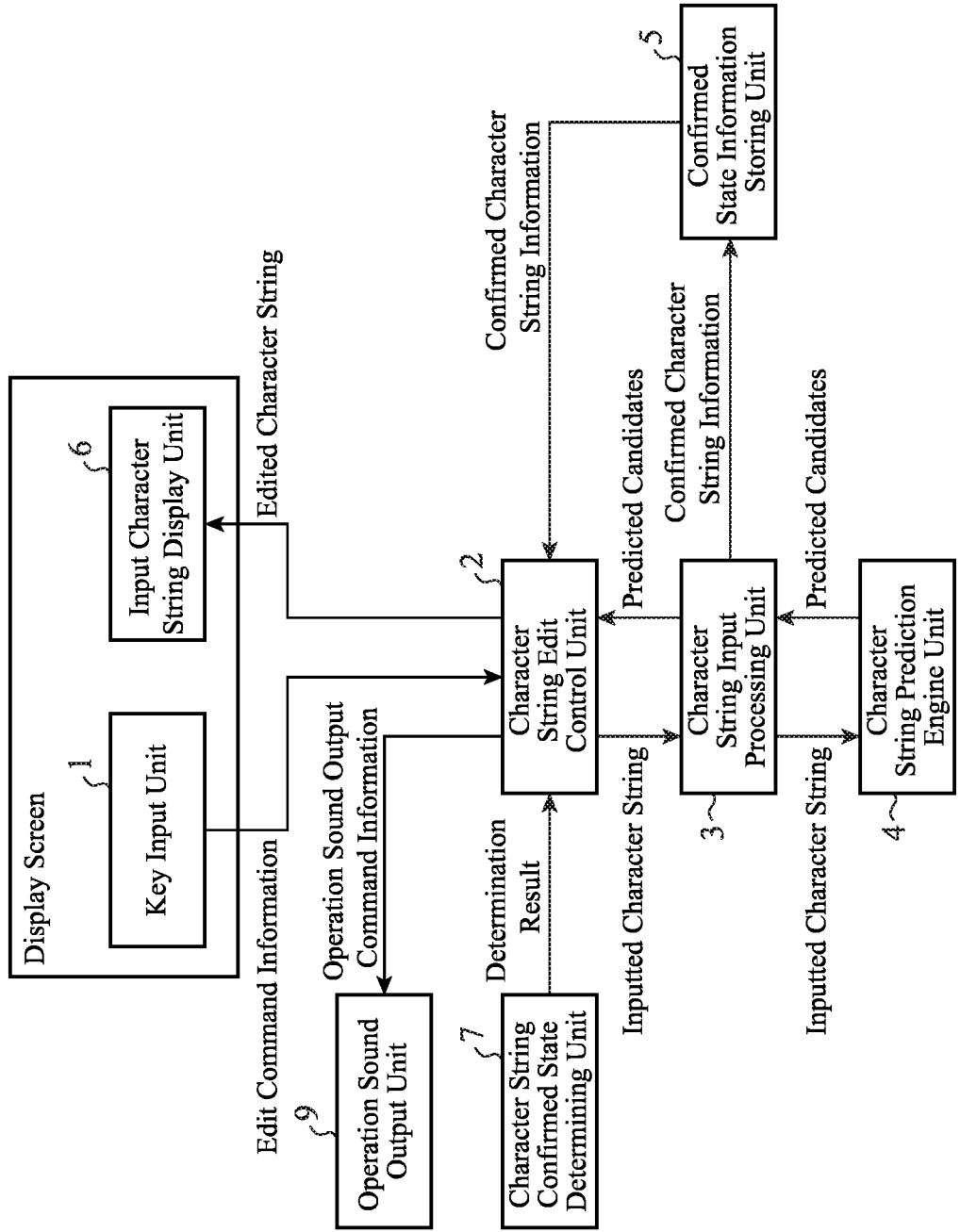
FIG. 27 is a block diagram showing the structure of a character input device in accordance with Embodiment 8.

FIG. 27 is a block diagram showing the structure of a character input device in accordance with Embodiment 8 of the present invention. In the character input device, an operation sound output unit 9 is added to the structural components in accordance with Embodiment 1 (FIG. 1). The operation sound output unit 9 outputs an operation sound according to a command from a character string edit control unit 2. Because the other structural components of the character input device are the same as those in accordance with Embodiment 1, the explanation of the other structural components will be omitted hereafter. The character input device in accordance with this Embodiment 8 is constructed in such a way as to, when a correction key 11 is pushed down, output an operation sound, and output the operation sound (change the operation sound) that changes between when a character is deleted according to a pushdown of the correction key 11 and when a confirmed character string is changed to an unconfirmed state according to a pushdown of the correction key 11. The character input device can determine the operation sound as appropriate. For example, the character input device can switch between a repetition of short operation sounds, such as "three short beeps", and only a long operation sound, such as a "long beep".

Figure 28:
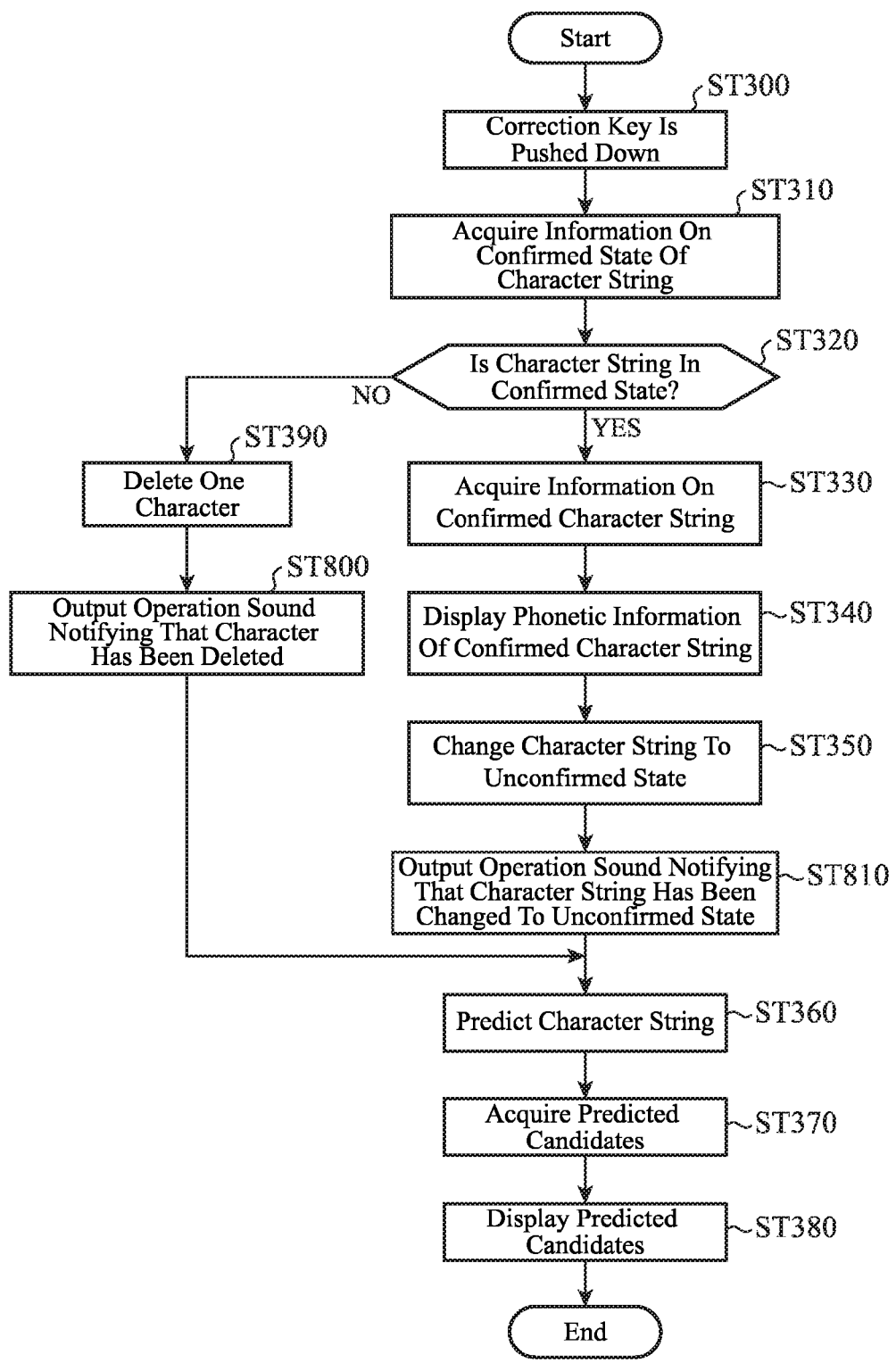
FIG. 28 is a flow chart explaining a process at a time when a user corrects an inputted character string in the character input device in accordance with Embodiment 8.

Next, the operation of the character input device will be explained. FIG. 28 is a flow chart explaining a process of correcting an inputted character string in the character input device in accordance with Embodiment 8 of the present invention. In this Embodiment 8, because the flow chart of FIG. 4 shown in Embodiment 1 is simply replaced by the flow chart of FIG. 28 and other processes (a process at a time when a user inputs characters and a process at a time when the user selects one of predicted candidates) are the same as those shown in Embodiment 1 (FIG. 3), the explanation of the other processes will be omitted hereafter. In this Embodiment 8, a process (step ST800) of, when the correction key 11 is pushed down while the character string is in an unconfirmed state (when NO in step ST320), and a single character is then deleted from the displayed character string in the unconfirmed state (step ST390), outputting an operation sound notifying that the character has been deleted is added. Further, a process (step ST810) of, when the correction key 11 is pushed down while the character string is in a confirmed state (when YES in step ST320), and the confirmed character string is then changed to the unconfirmed state (step ST350), outputting an operation sound notifying that the confirmed character string has been changed to the unconfirmed state is added. Because the other processes are the same as those in accordance with Embodiment 1, the explanation of the other processes will be omitted hereafter.

As previously explained, because the character input device in accordance with this Embodiment 8 provides the function of deleting an unconfirmed inputted character which the user is currently inputting, and the function of changing a confirmed character string to the unconfirmed state to the single correction key, and, when this correction key is pushed down, outputs the operation sound different according to whether the process of deleting a character or the process of reconverting a character string is carried out, the character input device can prevent the user from performing an erroneous operation even if he or she does not look at the screen.

Embodiment 9

Figure 29:
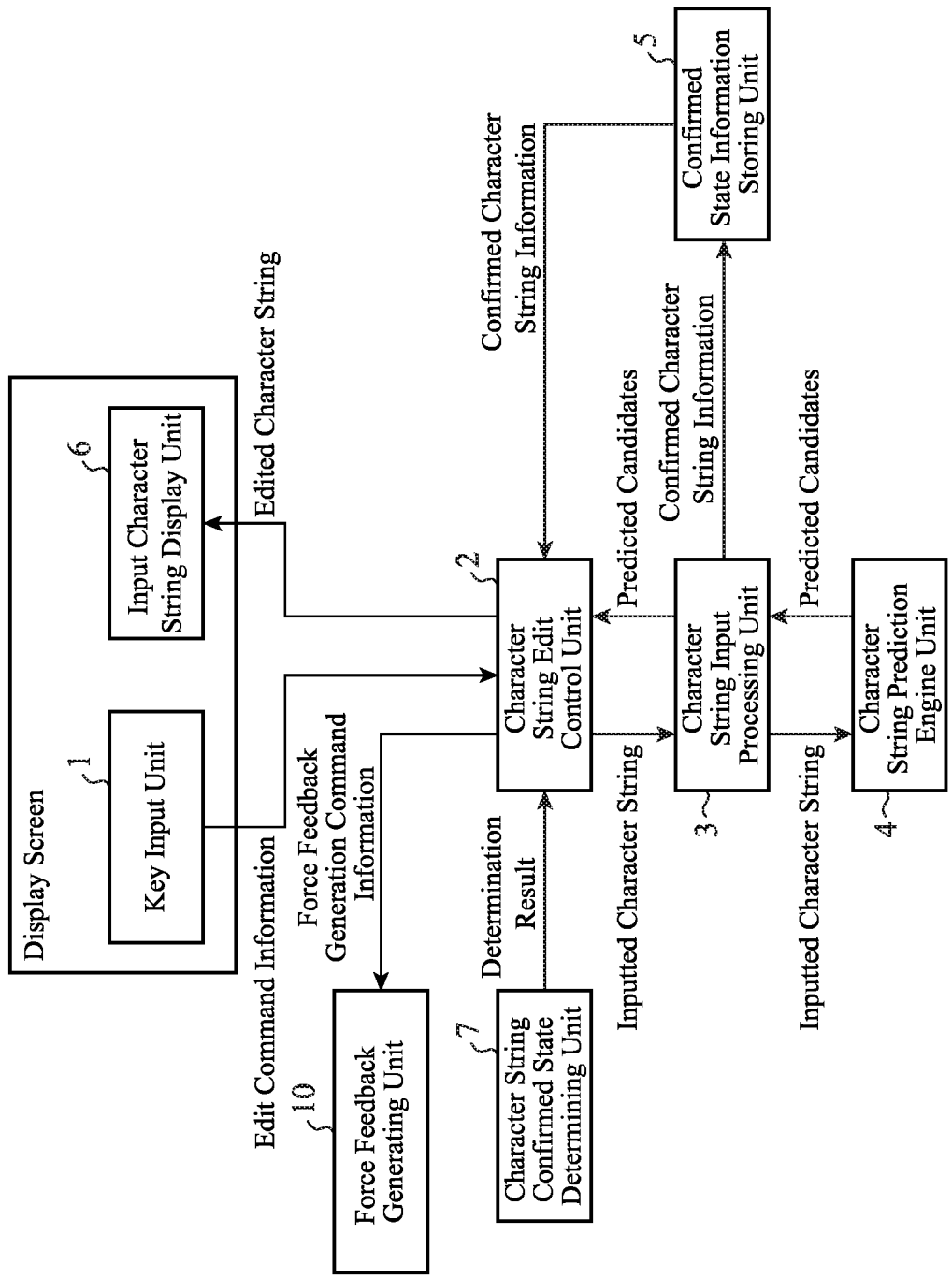
FIG. 29 is a block diagram showing the structure of a character input device in accordance with Embodiment 9.

FIG. 29 is a block diagram showing the structure of a character input device in accordance with Embodiment 9 of the present invention. In the character input device, a force feedback generating unit 10 is added to the structural components in accordance with Embodiment 1 (FIG. 1). The force feedback generating unit 10 carries out force feedback (feedback of vibrations, resistance, or the like) according to a command from a character string edit control unit 2. Because the other structural components of the character input device are the same as those in accordance with Embodiment 1, the explanation of the other structural components will be omitted hereafter. The character input device in accordance with this Embodiment 9 is constructed in such a way as to, when a correction key 11 is pushed down, carryout force feedback, and change the pattern of the force feedback between when a character is deleted according to a pushdown of the correction key 11 and when a confirmed character string is changed to an unconfirmed state according to a pushdown of the correction key 11. The character input device can determine this pattern of the force feedback as appropriate. For example, in the case in which the force feedback is vibrations, the character input device can switch between a pattern of repeating short vibrations and a pattern of generating long vibrations.

Figure 30:
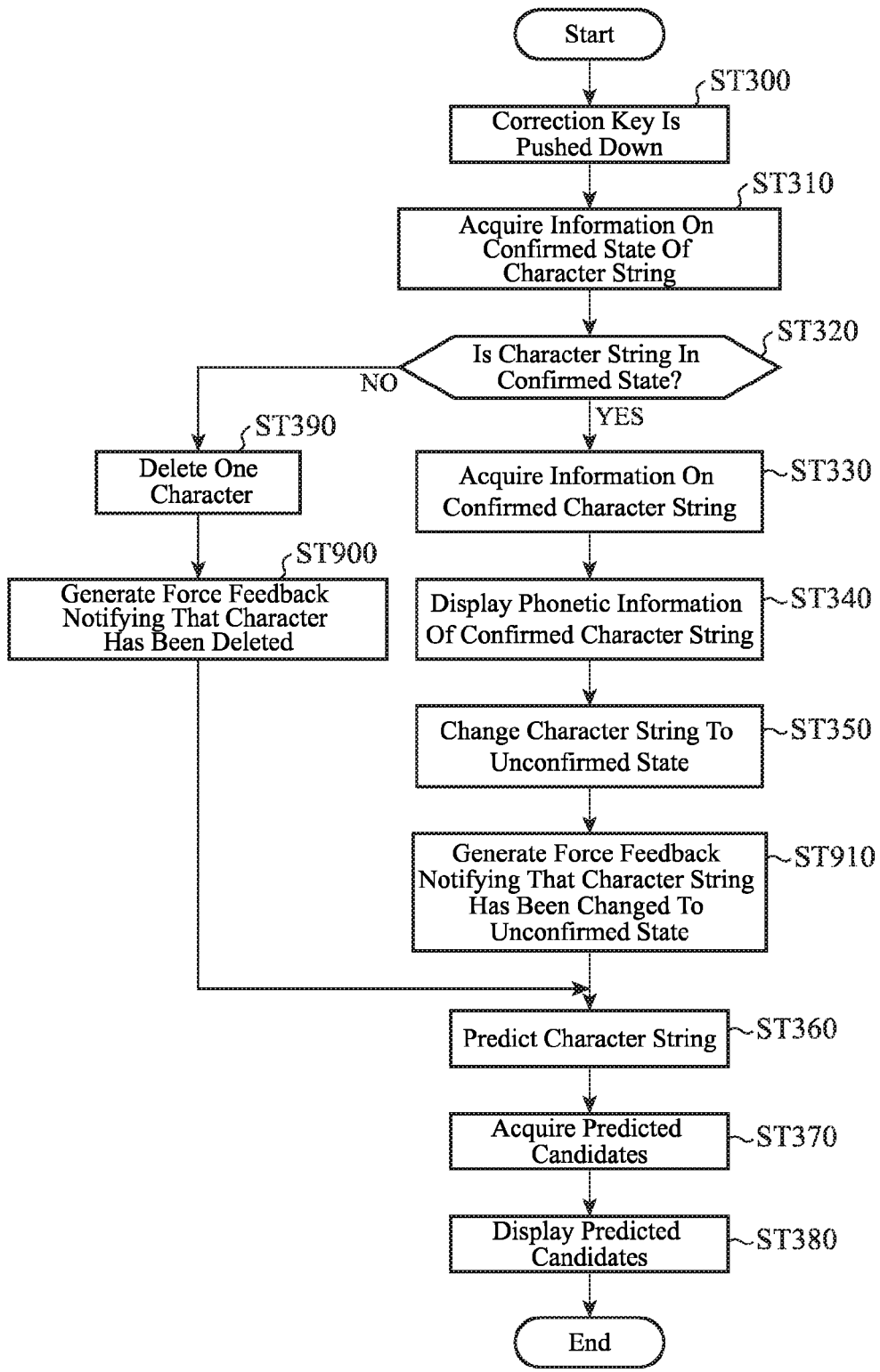
FIG. 30 is a flow chart explaining a process at a time when a user corrects an inputted character string in the character input device in accordance with Embodiment 9.

Next, the operation of the character input device will be explained. FIG. 30 is a flow chart explaining a process of correcting an inputted character string in the character input device in accordance with Embodiment 9 of the present invention. In this Embodiment 9, because the flow chart of FIG. 4 shown in Embodiment 1 is simply replaced by the flow chart of FIG. 30 and other processes (a process at a time when a user inputs characters and a process at a time when the user selects one of predicted candidates) are the same as those shown in Embodiment 1 (FIG. 3), the explanation of the other processes will be omitted hereafter. In this Embodiment 9, a process (step ST900) of, when the correction key 11 is pushed down while the character string is in an unconfirmed state (when NO in step ST320), and a single character is then deleted from the displayed character string in the unconfirmed state (step ST390), generating force feedback notifying that the character has been deleted is added. Further, a process (step ST910) of, when the correction key 11 is pushed down while the character string is in a confirmed state (when YES in step ST320), and the confirmed character string is then changed to the unconfirmed state (step ST350), generating force feedback notifying that the confirmed character string has been changed to the unconfirmed state is added. Because the other processes are the same as those in accordance with Embodiment 1, the explanation of the other processes will be omitted hereafter.

As previously explained, because the character input device in accordance with this Embodiment 9 provides the function of deleting an unconfirmed inputted character which the user is currently inputting, and the function of changing a confirmed character string to the unconfirmed state to the single correction key, and, when this correction key is pushed down, generates a pattern of force feedback different according to whether the process of deleting a character or the process of reconverting a character string is carried out, the character input device can prevent the user from performing an erroneous operation even if he or she does not look at the screen.

This character input device is suitable for use in small-size information equipment, such as a car navigation device and a mobile phone, as a character input device in which input keys are arranged in limited space. Further, the character input device can be applied to various pieces of information equipment such as a mobile computer, a game machine, etc. While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The character input device in accordance with the present invention is suitable for use in small-size information equipment, such as a car navigation device and a mobile phone, as a character input device in which input keys are arranged in limited space. Further, the character input device can be applied to various pieces of information equipment such as a mobile computer, a game machine, etc.

EXPLANATIONS OF REFERENCE NUMERALS

1 key input unit, 2 character string edit control unit, 3 character string input processing unit, 4 character string prediction engine unit, 5 confirmed character string information storing unit, 6 input character string display unit, 7 character string confirmed state determining unit, 8 key name changing unit, 9 operation sound output unit, 10 force feedback generating unit, 11 correction key, 12 character input key, 13 key for displaying character string candidates, 14 initial setting unit, 15 confirmed character string selection key.

The invention claimed is:

1. A character input device that carries out inputting and editing of character strings, said character input device comprising:
a memory to store information including phonetic information of a plurality of character strings; and
a controller: to receive an initial character string as an input; to acquire predicted character string candidates having phonetic information that includes phonetic information associated with the initial character string; to output the predicted character string candidates to a display; to control editing of input character strings or character strings selected from predicted character string candidates to generate edited character strings based on commands from a key input; and to output said edited character strings to the display, wherein
said controller executes, based on operation of a key of said key input, the two following character string editing control functions:
when said key is operated before one of said predicted character string candidates is selected according to a command from said key input, deleting a character string displayed on said display, and
when said key is operated after one of said predicted character string candidates is selected, changing a character string displayed on said display to a character string representing phonetic information of said character string selected from said predicted character string candidates.

2. The character input device according to claim 1, wherein said character input device is capable of setting descriptions of a command to be issued when said key is operated, and, when said key is operated after one of said predicted character string candidates is selected, said controller outputs a command to change character string displayed on said display to a character string displayed on said display before one of said predicted character string candidates is selected, instead of changing a character string displayed on said display to a character string representing phonetic information of said character string selected from said predicted character string candidates, according to the setting.

3. The character input device according to claim 1, wherein said controller outputs a command of changing a display of a name of said correction key according to whether or not one of said predicted character string candidates is selected.

4. The character input device according to claim 1, wherein when a character within one or more character strings which are selected from predicted character string candidates displayed on said display is specified, said controller acquires position information on the specified character within said one or more character strings, and said controller selects one character string including said specified character on a basis of said position information and the information stored in said memory, and changes selected character string displayed on said display to a character string representing phonetic information of said character string.

5. The character input device according to claim 1, wherein said key unit has a character string selection key for commanding said controller to select a character string from one or more character strings which are selected from predicted character string candidates displayed on said display, and said controller selects one character string on a basis of a command by said character string selection key and the information stored in said memory, and changes selected character string displayed on said display to a character string representing phonetic information of said character string.

6. The character input device according to claim 1, wherein said controller outputs a command of outputting an operation sound when said key is operated.

7. The character input device according to claim 6, wherein said operation sound is changed according to whether or not said key is operated after one of said predicted character string candidates is selected.

8. The character input device according to claim 1, wherein said controller outputs a command of generating force feedback when said key is operated.

9. The character input device according to claim 8, wherein a pattern of the force feedback is changed according to whether or not said key is operated after one of said predicted character string candidates is selected.

10. A car navigation device comprising a character input device according to claim 1.

11. A mobile phone comprising a character input device according to claim 1.

12. A mobile computer comprising a character input device according to claim 1.

13. A game machine comprising a character input device according to claim 1.

14. A method for inputting and editing of character strings, said method comprising:
stores information including phonetic information of a plurality of character strings; and
controlling input and editing operations that: receive an initial character string as an input; acquire predicted character string candidates having phonetic information that includes phonetic information associated with the initial character string; output the predicted character string candidates to a display; control editing of input character strings or character strings selected from predicted character string candidates to generate edited character strings based on commands from a key input; and output said edited character strings to the display, wherein
said controlling executes, based on operation of a key of said key input, the two following character string editing control functions:
when said key is operated before one of said predicted character string candidates is selected according to a command from said key input, deleting a character string displayed on said display, and
when said key is operated after one of said predicted character string candidates is selected, changing a character string displayed on said display to a character string representing phonetic information of said character string selected from said predicted character string candidates.

* * * * *